United States Patent
Blom

(10) Patent No.: US 11,635,351 B2
(45) Date of Patent: Apr. 25, 2023

(54) METHODS OF CALIBRATING POSITIONS OF WHEELS IN AN AUTOMATED GUIDED VEHICLE, AND AUTOMATED GUIDED VEHICLE

(71) Applicant: ABB Schweiz AG, Baden (CH)

(72) Inventor: Jonatan Blom, Sundbyberg (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/596,788

(22) PCT Filed: Jun. 26, 2019

(86) PCT No.: PCT/EP2019/067045
§ 371 (c)(1),
(2) Date: Dec. 17, 2021

(87) PCT Pub. No.: WO2020/259827
PCT Pub. Date: Dec. 30, 2020

(65) Prior Publication Data
US 2022/0205872 A1    Jun. 30, 2022

(51) Int. Cl.
*G01M 17/013* (2006.01)
*G01M 17/06* (2006.01)

(52) U.S. Cl.
CPC .......... *G01M 17/013* (2013.01); *G01M 17/06* (2013.01)

(58) Field of Classification Search
CPC .......................... G01M 17/013; G01M 17/06
See application file for complete search history.

(56) References Cited

U.S. PATENT DOCUMENTS 6,412,183 B1    7/2002  Uno

FOREIGN PATENT DOCUMENTS

| CN | 106143676 A | 11/2016 |
| CN | 107538521 A | 1/2018 |
| CN | 108909436 A | 11/2018 |

OTHER PUBLICATIONS

Jin, Position Estimation and Motion Control of Omni-directional Mobile Robot with Active Caster Wheels, IEEE, Aug. 2008 (Year: 2008).*
Eitel, Electric actuators for better robotic vehicle steering, https://www.therobotreport.com/electric-actuators-for-better-robotic-vehicle-steering/, Mar. 2019 (Year: 2019).*
(Continued)

*Primary Examiner* — Eric S. McCall
*Assistant Examiner* — Timothy P Graves
(74) *Attorney, Agent, or Firm* — Whitmyer IP Group LLC

(57) ABSTRACT

A method of calibrating positions of wheels in an AGV, the method including positioning a second wheel tangentially on an imaginary second circle centered with respect to a center position in which a first wheel is fixed; driving the second wheel a second distance along the second circle such that the AGV rotates about the center position; determining the second distance based on data from a second wheel sensor device of the second wheel; determining an angle of rotation about the center position based on data from a first steering sensor device of the first wheel during the rotation of the AGV; and determining relative positions between the first wheel and the second wheel based on the second distance and the angle of rotation. An AGV is also provided.

7 Claims, 16 Drawing Sheets

(56) References Cited

OTHER PUBLICATIONS

Kit, Chow Man. Development of a Service Robot with an Open Architecture and Advanced Interface. Diss. The Chinese University of Hong Kong, 2003 (Year: 2003).*

Grimstad, Lars. Powertrain, steering and control components for the NMBU Agricultural Mobile Robotic Platform. MS thesis. Norwegian University of Life Sciences, Ås, 2014 (Year: 2014).*

YouTube, "Homing Methods for LEGO Robotics", 2013; https://www.youtube.com/watch?v=anE3rqQPNA0 (Year: 2013).*

Alameda County Automatic Guided Vehicle Technician Recruitment #12-9232-01; https://jobapscloud.com/Alameda/sup/bulpreview.asp?R1=12&R2=9232&R3=01 (Year: 2012).*

DCCCD 2018-2019 catalog; https://www1.dcccd.edu/cat1819/programs/degree.cfm?degree=adv_manu_mech_tech_cert&loc=econ (Year: 2018).*

YouTube, Cheap Science: Robot Odometry Calibration, 2013; https://www.youtube.com/watch?v=qsdilZncgqo (Year: 2013).*

International Search Report and Written Opinion of the International Searching Authority; Application No. PCT/EP2019/067045; Completed: Feb. 26, 2020; dated Mar. 3, 2020; 13 Pages.

International Preliminary Report on Patentability; Application No. PCT/EP2019/067045; Completed Dec. 28, 2021; 7 Pages.

* cited by examiner

METHODS OF CALIBRATING POSITIONS OF WHEELS IN AN AUTOMATED GUIDED VEHICLE, AND AUTOMATED GUIDED VEHICLE

TECHNICAL FIELD

The present disclosure generally relates to automated guided vehicles. In particular, methods of calibrating positions of wheels in an automated guided vehicle and an automated guided vehicle, are provided.

BACKGROUND

Automated guided vehicles (AGVs) are typically self-powered, self-driven vehicles used to transport materials and other items from one location to another, without the need for a driver on the vehicle. AGVs are commonly used in manufacturing sites, warehouses, post offices, libraries, port terminals, airports, and some hazardous locations and specialty industries.

CN 106143676 A discloses a programmable AGV with supporting steering. The structure of the programmable AGV comprises a vehicle body, hydraulic supporting devices, hub motor assemblies, an automatic guide system and battery parts for providing energy.

SUMMARY

If an AGV comprises a support structure and a plurality of modular drive units with wheels connected to the platform, the configuration of the AGV can be changed. For example, an end user may add drive units to the support structure, remove drive units from the support structure, and/or change the position of one or more drive units relative to the support structure. This type of configuration may be referred to as a late configuration.

The configuration of the AGV may be changed in order to meet requirements of a new application for the AGV. For example, different applications of the AGV may put different requirements on payload capacity, acceleration, size, footprint and/or stability. An end user may also configure an AGV for the first time, e.g. if the AGV is shipped to the end user in a disassembled state.

In order for the AGV to be able to navigate accurately, the relative positions between the wheels need to be known. If the relative positions of the wheels are gathered from a computer-aided design (CAD) model, these positions may not match accurately with the AGV constructed from the CAD model, for example due to human errors when mounting the drive units and/or due to tolerances. A calibration of the wheel positions therefore has to be carried out.

Calibration of wheel positions is however not only necessarily for modular AGVs. Calibration of an AGV may be required for various reasons, for example after replacement of a component in the AGV and/or due to insufficient previous calibration.

One object of the present disclosure is to provide a method of calibrating positions of wheels in an AGV, which method is simple, e.g. for being carried out by a less skilled operator.

A further object of the present disclosure is to provide a method of calibrating positions of wheels in an AGV, which method provides an accurate calibration.

A still further object of the present disclosure is to provide a method of calibrating positions of wheels in an AGV, which method is cheap.

A still further object of the present disclosure is to provide a method of calibrating positions of wheels in an AGV, which method solves several or all of the foregoing objects in combination.

A still further object of the present disclosure is to provide an AGV solving one, several or all of the foregoing objects.

According to one aspect, there is provided a method of calibrating positions of wheels in an AGV, the AGV comprising a support structure and at least two drive units connected to the support structure, wherein each drive unit comprises a wheel rotatable about a wheel axis and about a steering axis perpendicular to the wheel axis; a wheel motor arranged to drive the wheel about the wheel axis; a wheel sensor device arranged to determine a rotational position of the wheel about the wheel axis; a steering motor arranged to drive the wheel about the steering axis; and a steering sensor device arranged to determine a rotational position of the wheel about the steering axis; wherein the method comprises positioning a second wheel tangentially on an imaginary second circle centered with respect to a center position in which a first wheel is fixed; driving the second wheel a second distance along the second circle such that the AGV rotates about the center position; determining the second distance based on data from the second wheel sensor device of the second wheel; determining an angle of rotation about the center position based on data from the first steering sensor device of the first wheel during the rotation of the AGV; and determining relative positions between the first wheel and the second wheel based on the second distance and the angle of rotation.

The method enables a simple and accurate determination of relative positions of two or more wheels by using relatively cheap equipment. The method is particularly useful for fine tuning positions of wheels connected to a custom-made support structure. The method does not require any measurements of the relative positions of the wheels, which may be a complicated and tiresome process.

Once the first wheel has been fixed in the center position, the position calibration can be carried out automatically. The method is therefore very simple and user-friendly.

The second wheel may be driven along the second circle by means of the wheel motor of the second drive unit and/or by means of the steering motor of the first drive unit. Alternatively, or in addition, the second wheel may be driven by means of the wheel motor of a further drive unit of the AGV.

The support structure may be rigid. The support structure may comprise a support surface for supporting a load, for example an industrial robot.

Each of the steering sensor device and the wheel sensor device may be a rotary encoder with high resolution, such as with at least 1000 measuring units per degree. High-resolution rotary encoders for the steering motors and the wheel motors are commercially available at relatively low cost.

The AGV may comprise at least three drive units. In this case, the method may comprise positioning a third wheel tangentially on an imaginary third circle centered with respect to the center position; driving the third wheel a third distance along the third circle at the same time as the second wheel is driven the second distance along the second circle; determining the third distance based on data from the wheel sensor device of the third wheel; and determining the relative positions between the first wheel and the third wheel based on the third distance and the angle of rotation.

The driving of the second wheel along the second circle and the driving of the third wheel along the third circle can be accomplished by means of the wheel motor of the second drive unit, the wheel motor of the third drive unit and/or the steering motor of the first drive unit.

The positioning of the second wheel tangentially on the second circle may comprise controlling the steering position of the first wheel about the first steering axis based on a first target steering position; controlling the wheel torque of the second wheel about the second wheel axis based on a second target wheel torque; rotating the second wheel about the second steering axis over a second steering axis range; and determining that the second wheel is positioned tangentially on the second circle at a position about the second steering axis where a maximum torque in the steering motor of the first wheel is observed. This variant may be carried out by an AGV comprising only two drive units. In case a third wheel is used, the third wheel may be a wheel of a third drive unit or a caster wheel.

Moreover, in case the AGV comprises a third drive unit, the variant may further comprise controlling the steering position of the third wheel about the third steering axis based on a third target steering position, i.e. when the second wheel is rotated about the second steering axis over the second steering axis range. The corresponding steps may then be repeated in order to position the third wheel tangentially on the third circle, i.e. by controlling the steering position of the second wheel about the second steering axis based on a second target steering position, by controlling the wheel torque of the third wheel about the third wheel axis based on a third target wheel torque, by rotating the third wheel about the third steering axis over a third steering axis range, and by determining that the third wheel is positioned tangentially on the third circle at a position about the third steering axis in the third steering axis range where a maximum torque in the steering motor of the first wheel is observed.

The first wheel may be fixed in the center position by means of a fixture. A force sensing arrangement may be arranged to determine forces in a plane parallel with the wheel axes between the first wheel and the fixture. The force sensing arrangement may be arranged in the fixture. Alternatively, such force sensing arrangement may be arranged in each wheel. In this case, the positioning of the second wheel tangentially on the second circle and/or the positioning of the third wheel tangentially on the third circle may comprise controlling the steering position of the second wheel about the second steering axis based on a second target steering position; controlling the steering position of the third wheel about the third steering axis based on a third target steering position; rotating the support structure relative to the first wheel over a first steering axis range by controlling the wheel torque of the second wheel about the second wheel axis and/or by controlling the wheel torque of the third wheel about the third wheel axis; and adjusting the steering position of the second wheel and/or the steering position of the third wheel based on a force determined by the force sensing arrangement during the rotation of the support structure.

According to a further aspect, there is provided a method of calibrating positions of wheels in an AGV, the AGV comprising a support structure and at least three drive units connected to the support structure, wherein each drive unit comprises a wheel rotatable about a wheel axis and about a steering axis perpendicular to the wheel axis; a wheel motor arranged to drive the wheel about the wheel axis; a wheel sensor device arranged to determine a rotational position of the wheel about the wheel axis and/or an accelerometer arranged to determine a gravity vector; a steering motor arranged to drive the wheel about the steering axis; and a steering sensor device arranged to determine a rotational position of the wheel about the steering axis; wherein the method comprises positioning the AGV in a first AGV position in relation to a geometric arrangement; obtaining first AGV position data from each drive unit in the first AGV position; positioning the AGV in a second AGV position in relation to the geometric arrangement; obtaining second AGV position data from at least one of the drive units in the second AGV position; and determining relative positions between three wheels of the drive units based on the first AGV position data and the second AGV position data.

The method may comprise positioning the AGV in the first AGV position in relation to the geometric arrangement and determining a reference gravity vector for each drive unit; raising the first wheel with respect to a level surface, and positioning the first wheel, the second wheel and the third wheel in parallel about their respective steering axis based on the gravity vector for each drive unit. The positioning of the wheels about the respective steering axis may be made such that the respective gravity vector passes through the associated wheel, i.e. lies in a main extension plane of the associated wheel which is perpendicular to the wheel axis. In the first AGV position, the reference gravity vector for each drive unit may be determined by means of a respective accelerometer of each drive unit. As an alternative, the reference gravity vector for each drive unit may be determined based on an assumption that the level surface is perfectly horizontal.

The second AGV position data may comprise data from the wheel sensor device of at least one drive unit in the second AGV position.

In the second AGV position, a second wheel and a third wheel may be positioned on a level surface and a first wheel may be raised with respect to the level surface.

In the first AGV position, the second wheel and the third wheel may be positioned on the level surface and the first wheel may be positioned at a first inclined position on an inclined surface inclined with respect to the level surface. In the second AGV position, the first wheel may be positioned at a second inclined position on the inclined surface. The method may further comprise driving the AGV between the first AGV position and the second AGV position such that the first wheel moves along the inclined surface from the first inclined position to the second inclined position. At the same time, the second wheel and the third wheel move along the level surface.

The first AGV position data may comprise data from the wheel sensor device of at least two drive units in the first AGV position, and the second AGV position data may comprise data from the wheel sensor device of the at least two drive units in the second AGV position, e.g. of the first drive unit and of at least one of the second drive unit and the third drive unit.

In the first AGV position, the first wheel, the second wheel and the third wheel may be positioned on the level surface. In the second AGV position, the first wheel may be positioned on a support object of known height with respect to the level surface. The support object may for example be a box.

The first AGV position data may comprise the gravity vector for at least one drive unit in the first AGV position, and the second AGV position data may comprise the gravity vector for at least one drive unit in the second AGV position. In this case, the first AGV position data and the second AGV position data may be collected from the same or different drive units.

According to a further aspect, there is provided a method of calibrating positions of wheels in an AGV, the AGV comprising a support structure and at least two drive units connected to the support structure, wherein each drive unit comprises a wheel rotatable about a wheel axis and about a steering axis perpendicular to the wheel axis; a wheel motor arranged to drive the wheel about the wheel axis; a wheel sensor device arranged to determine a rotational position of the wheel about the wheel axis; a steering motor arranged to drive the wheel about the steering axis; and a steering sensor device arranged to determine a rotational position of the wheel about the steering axis; wherein the method comprises rotating each wheel about the respective steering axis to trigger a steering homing switch of each wheel; determining an absolute steering position of each wheel about the steering axis based on data from the steering sensor device when the steering homing switch is triggered; after determining the absolute steering position of each wheel, rotating each wheel about the respective wheel axis to trigger a wheel homing switch of each wheel; and determining an absolute wheel position of each wheel about the wheel axis based on data from the wheel sensor device when the wheel homing switch is triggered.

The method utilizes the fact that the wheels can be rotated about the respective steering axis when the AGV is at standstill. The steering motors are thus homed first. Once the steering motors are homed and absolute steering positions of the wheels are determined, the wheels can be positioned in a valid configuration. With valid configuration is meant all wheel positions with an instant center of rotation (ICR) and parallel wheel positions. Instead of absolute rotary encoders, the method enables the use of cheaper relative or incremental rotary encoders for the steering motor and the wheel motor.

The rotation of each wheel about the respective wheel axis to trigger the wheel homing switch may comprise driving each wheel along a path comprising an arc. Alternatively, or in addition, the path may comprise a straight line.

The rotation of each wheel about the respective wheel axis to trigger the wheel homing switch may comprise driving each wheel along a continuous path. The continuous path may for example be a circle (i.e., a path comprising an arc). Alternative paths comprising an arc are elliptical paths. Alternatively, each wheel may be driven along a respective 8-shaped path.

The rotation of each wheel about the respective wheel axis to trigger the wheel homing switch may comprise driving each wheel such that the AGV rotates about a rotation point. Alternatively, or in addition, the method may be automatically performed at start-up of the AGV.

According to a further aspect, there is provided an AGV comprising a support structure and at least two drive units connected to the support structure, wherein each drive unit comprises a wheel rotatable about a wheel axis and about a steering axis perpendicular to the wheel axis; a wheel motor arranged to drive the wheel about the wheel axis; a wheel sensor device arranged to determine a rotational position of the wheel about the wheel axis; a steering motor arranged to drive the wheel about the steering axis; and a steering sensor device arranged to determine a rotational position of the wheel about the steering axis; wherein the AGV is configured to carry out any method according to the present disclosure.

BRIEF DESCRIPTION OF THE DRAWINGS

Further details, advantages and aspects of the present disclosure will become apparent from the following embodiments taken in conjunction with the drawings, wherein.

DETAILED DESCRIPTION

Figure 1:
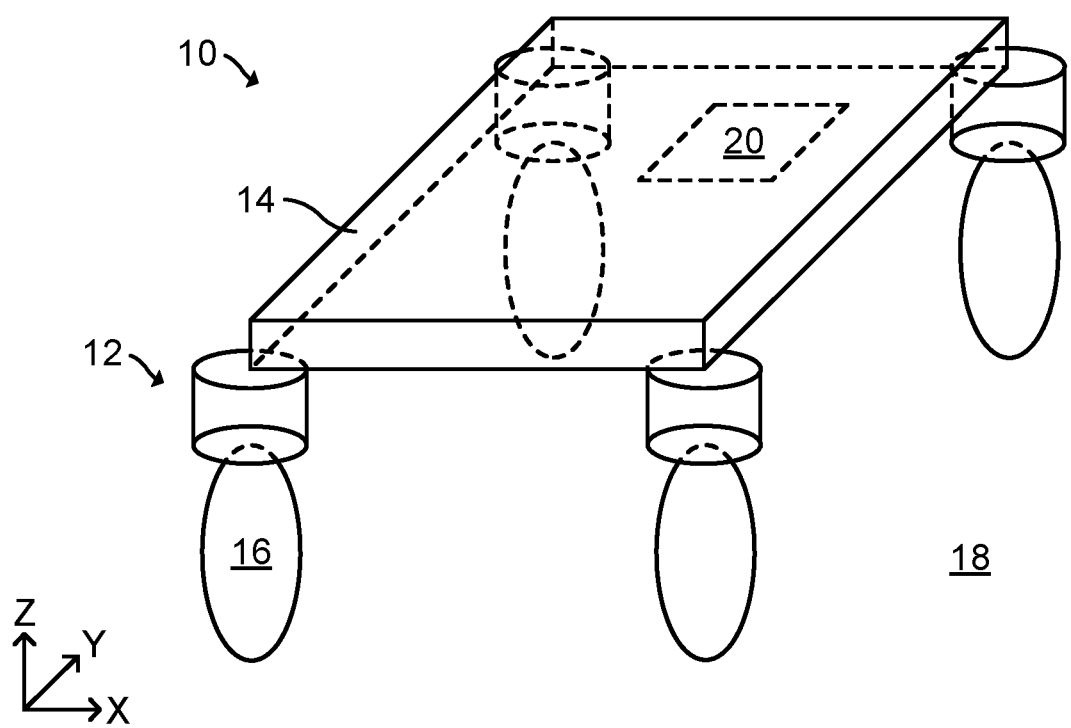
FIG. 1 schematically represents a perspective view of an AGV comprising a plurality of drive units.

In the following, methods of calibrating positions of wheels in an automated guided vehicle and an automated guided vehicle, will be described. The same or similar reference numerals will be used to denote the same or similar structural features.

FIG. 1 schematically represents a perspective view of an automated guided vehicle (AGV) 10. The AGV 10 comprises a plurality of drive units 12. The AGV 10 further comprises a support structure 14, here exemplified as a platform. In FIG. 1, the AGV 10 comprises four drive units 12. The AGV 10 may however comprise fewer than four drive units 12 or more than four drive units 12. Each drive unit 12 comprises a wheel 16.

The wheels 16 are traction wheels for driving the AGV 10 on a surface, such as a floor. FIG. 1 further shows a Cartesian coordinate system X, Y, Z for reference purposes. In FIG. 1, the AGV 10 is positioned on a level surface 18 in the XY-plane.

The support structure 14 can carry a load, for example an industrial robot (not shown). The robot may comprise at least one manipulator operable in three or more axes. The AGV 10 and the robot may be moved simultaneously when carrying out a task by the robot.

The drive units 12 are modular. Due to their modularity, drive units 12 can be added to, and/or removed from, the support structure 14. The drive units 12 may be connected to different sections of the support structure 14. Thus, the number of drive units 12 and their placement on the support structure 14 can be tailored for a specific application. In FIG. 1, each drive unit 12 is connected to a corner of the support structure 14.

The AGV 10 further comprises a central control system 20. The central control system 20 is provided in the support structure 14. The central control system 20 is in signal communication with each drive unit 12 via controller area network (CAN) buses (not shown). The central control system 20 may also comprise a battery (not shown) for powering each drive unit 12.

Figure 2:
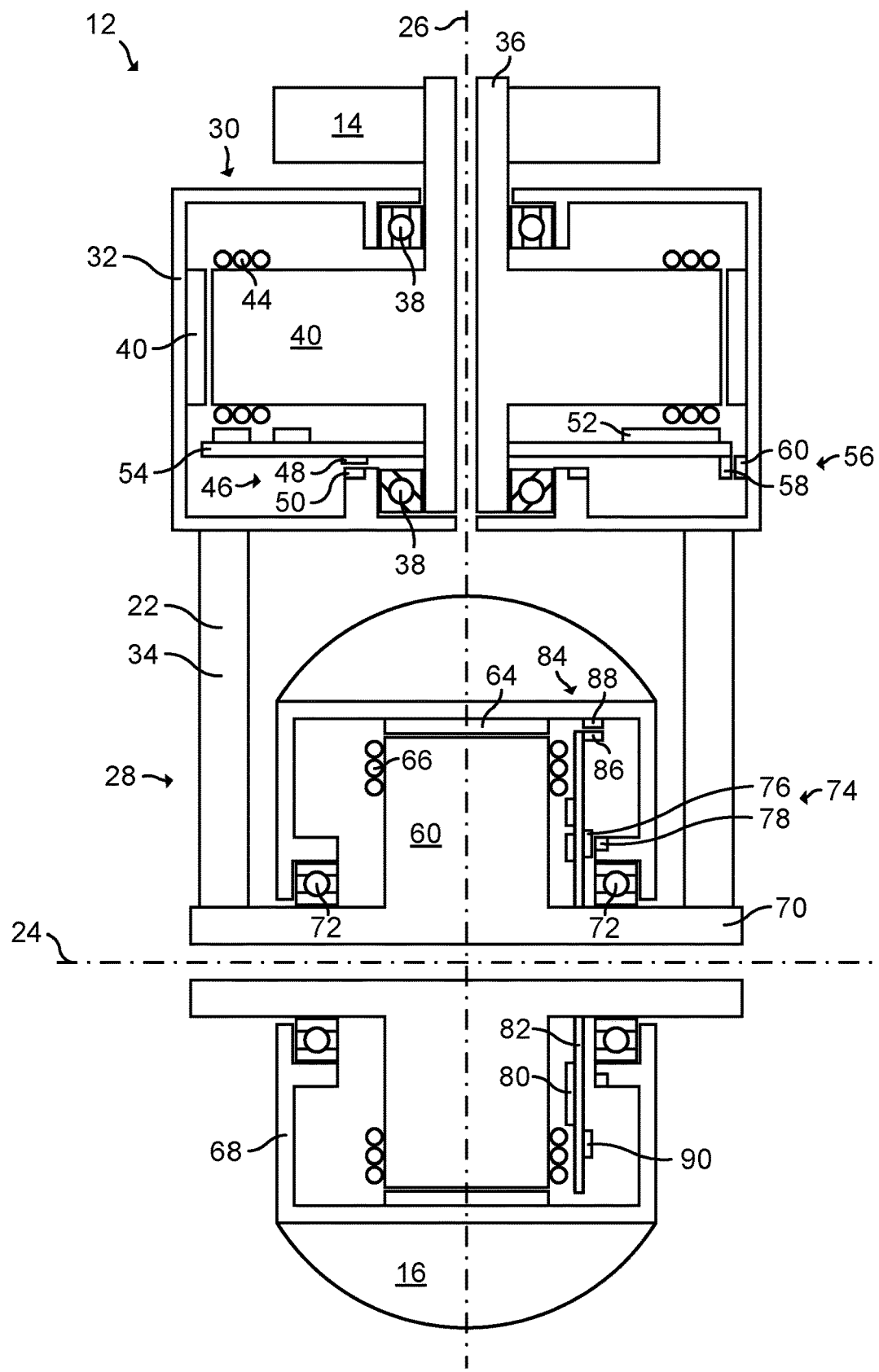
FIG. 2 schematically represents a cross-sectional view of one example of a drive unit of the AGV.

FIG. 2 schematically represents a cross-sectional view of one example of a drive unit 12 of the AGV 10. In addition to the wheel 16, the drive unit 12 comprises a driven steering member 22. The wheel 16 is rotatable about a wheel axis 24. The driven steering member 22 and the wheel 16 are rotatable about a steering axis 26. The wheel axis 24 is perpendicular to the steering axis 26. Moreover, the wheel axis 24 intersects the steering axis 26. In FIG. 2, the wheel axis 24 is horizontal and the steering axis 26 is vertical. The wheel axis 24 and the steering axis 26 provide two degrees of freedom for the drive unit 12.

The drive unit 12 further comprises an electric synchronous wheel motor 28. The wheel motor 28 is arranged to rotationally drive the wheel 16 about the wheel axis 24. In this example, the wheel motor 28 is arranged to directly drive the wheel 16, i.e. without any intermediate gearing between the wheel motor 28 and the wheel 16. The wheel motor 28 is arranged inside the wheel 16.

The drive unit 12 further comprises an electric synchronous steering motor 30. The steering motor 30 is arranged to rotationally drive the driven steering member 22 about the steering axis 26. The steering motor 30 is arranged to directly drive the driven steering member 22, i.e. without any intermediate gearing between the steering motor 30 and the driven steering member 22. The driven steering member 22 of the example in FIG. 2 comprises a base part 32 and two arm parts 34 extending downwards from the base part 32. The steering motor 30 of this example is arranged inside the base part 32.

The drive unit 12 further comprises a steering shaft 36 and two steering bearings 38 for rotationally supporting the driven steering member 22 about the steering axis 26. The steering shaft 36 is rigidly secured to the support structure 14. The steering motor 30 comprises a steering stator 40, a steering rotor 42 and steering coils 44 arranged on the steering stator 40.

The drive unit 12 further comprises a steering sensor device 46. The steering sensor device 46 determines a rotational position of the driven steering member 22, and consequently also of the wheel 16, about the steering axis 26. The steering sensor device 46 comprises an active part, here constituted by a Hall effect steering sensor 48, and a passive part, here constituted by a multipole steering encoder ring 50. The steering encoder ring 50 may for example comprise 128 poles. The steering sensor device 46 thereby constitutes a relatively cheap high-resolution encoder for accurate determination of a rotational position of the steering rotor 42, the driven steering member 22 and the wheel 16 about the steering axis 26.

The drive unit 12 further comprises steering drive electronics 52. The steering drive electronics 52 controls the operation of the steering motor 30, for example by means of PWM control.

The drive unit 12 further comprises a steering circuit board 54. The Hall effect steering sensor 48 and the steering drive electronics 52 are provided on the steering circuit board 54. The steering encoder ring 50 is connected to the driven steering member 22.

The drive unit 12 further comprises a steering homing switch 56 for homing the steering motor 30. The steering homing switch 56 comprises a steering homing sensor 58 and a steering homing magnet 60. The steering homing sensor 58 is provided on the steering circuit board 54. The steering homing magnet 60 is provided on the base part 32.

The steering homing switch 56 is triggered when the steering homing magnet 60 passes the steering homing sensor 58. Thereby, the steering motor 30 is homed. The steering homing switch 56 does however not need to operate magnetically. The steering homing switch 56 may alternatively operate optically or mechanically.

The wheel motor 28 comprises a wheel stator 62, a wheel rotor 64 and wheel coils 66 arranged on the wheel stator 62. The wheel 16 comprises a hub 68. The drive unit 12 further comprises a wheel shaft 70 and two-wheel bearings 72 for rotationally supporting the wheel 16 about the wheel axis 24. The wheel shaft 70 is rigidly connected to the arm parts 34.

The drive unit 12 further comprises a wheel sensor device 74. The wheel sensor device 74 may be of the same type as the steering sensor device 46. The wheel sensor device 74 determines a rotational position of the wheel 16 about the wheel axis 24. The wheel sensor device 74 comprises an active part, here constituted by a Hall effect wheel sensor 76, and a passive part, here constituted by a multipole wheel encoder ring 78. The wheel encoder ring 78 may for example comprise 128 poles. The wheel sensor device 74 thereby constitutes a relatively cheap high-resolution encoder for accurate determination of a rotational position of the wheel rotor 64 and the wheel 16 about the wheel axis 24.

The drive unit 12 further comprises wheel drive electronics 80. The wheel drive electronics 80 controls the operation of the wheel motor 28, for example by means of PWM control.

The drive unit 12 further comprises a wheel circuit board 82. The Hall effect wheel sensor 76 and the wheel drive electronics 80 are provided on the wheel circuit board 82. The wheel encoder ring 78 is connected to the hub 68.

The drive unit 12 further comprises a wheel homing switch 84 for homing the wheel motor 28. The wheel homing switch 84 comprises a wheel homing sensor 86 and a wheel homing magnet 88. The wheel homing sensor 86 is provided on the wheel circuit board 82. The wheel homing magnet 88 is provided on the hub 68.

The wheel homing switch 84 does however not need to operate magnetically. The wheel homing switch 84 may alternatively operate optically or mechanically.

The wheel homing switch 84 is triggered when the wheel homing magnet 88 passes the wheel homing sensor 86. Thereby, the wheel motor 28 is homed.

The drive unit 12 further comprises an accelerometer 90. The accelerometer 90 determines acceleration of the wheel 16. The accelerometer 90 may for example be a low cost micromachined microelectromechanical systems (MEMS) accelerometer. In this example, the accelerometer 90 is provided on the wheel circuit board 82. The accelerometer 90 may however be positioned elsewhere in the drive unit 12.

Figure 3A:
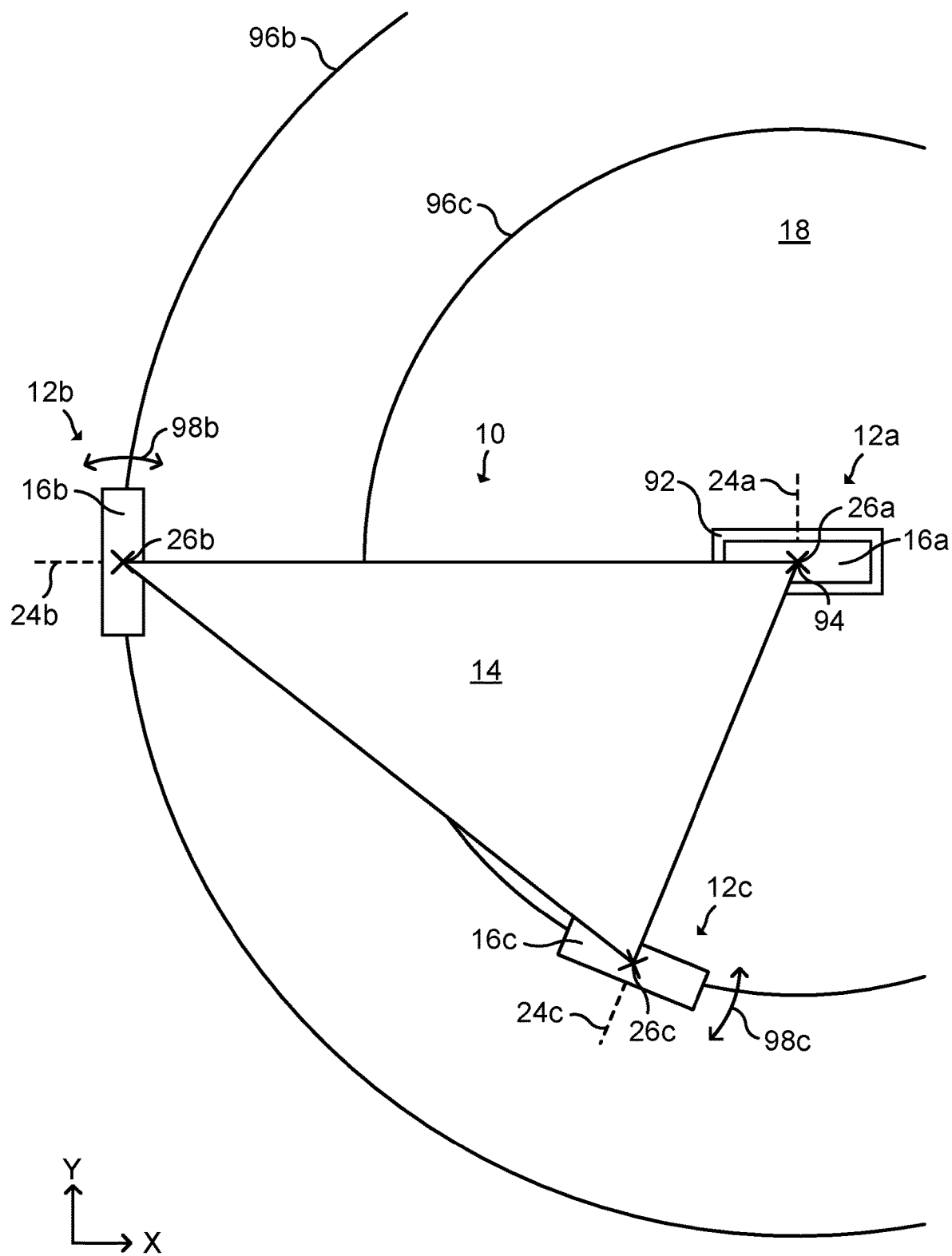
FIGS. 3a, 3b and 4 schematically represent an AGV in a first example of calibration.
Figure 3B:
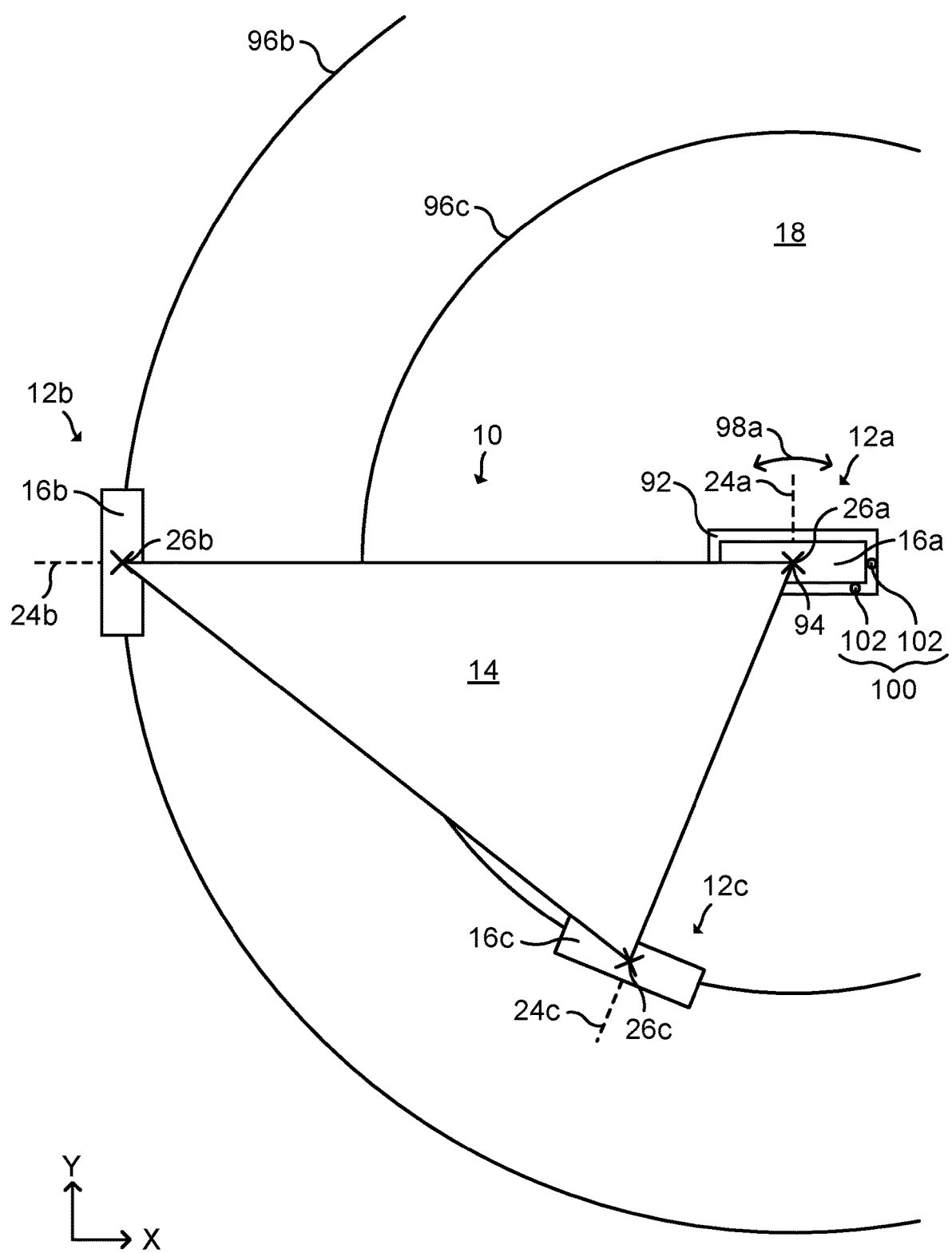
Figure 4:
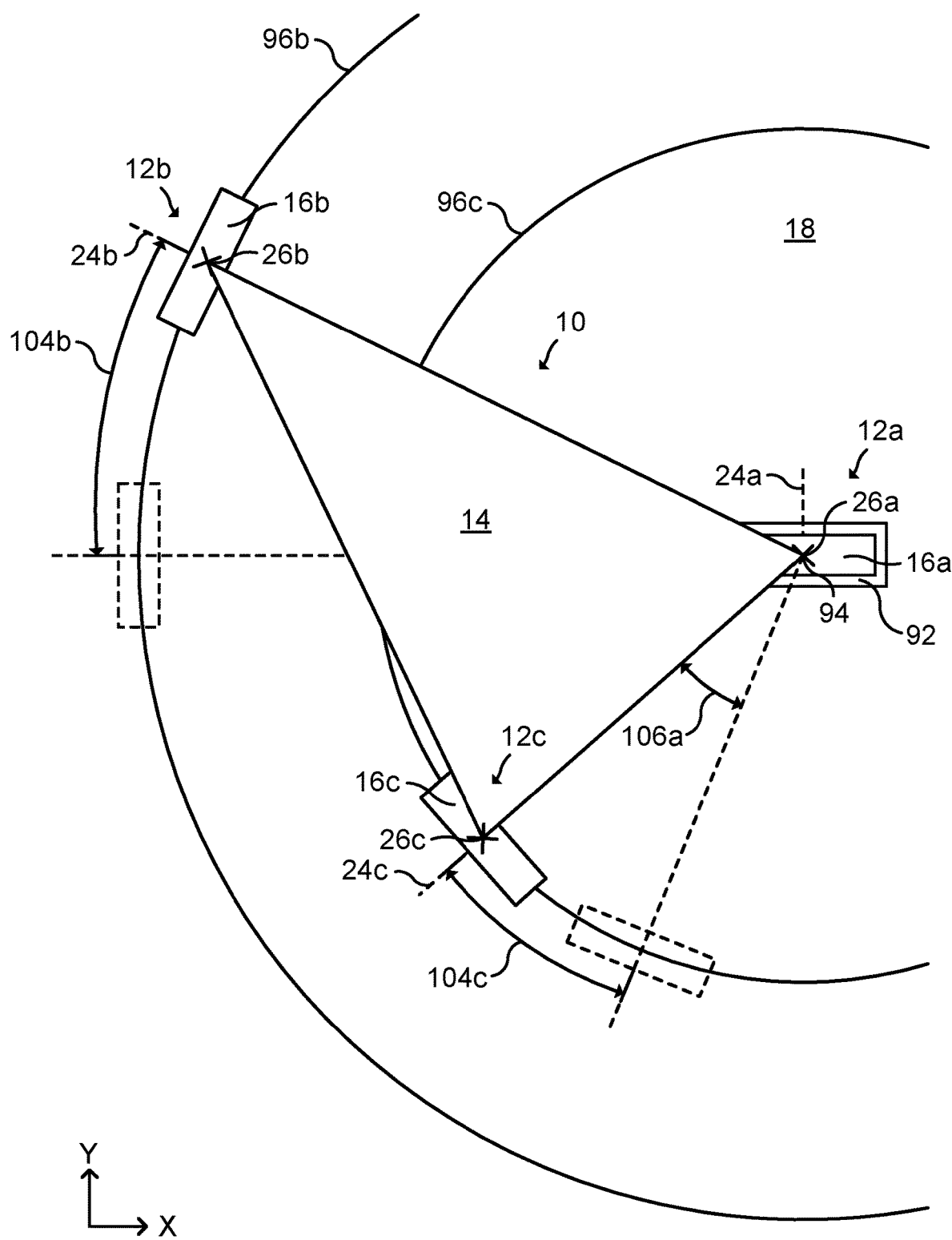

FIGS. 3a, 3b and 4 schematically represent an AGV 10 in a first example of calibrating positions of wheels 16 of the AGV 10. The AGV 10 in this example comprises a first drive unit 12a with a first wheel 16a, a second drive unit 12b with second wheel 16b, and a third drive unit 12c with a third wheel 16c. Each drive unit 12a-12c is connected to a support structure 14 and is of the same type as in FIG. 2. The AGV 10 has high requirements on positional accuracy of the wheels 16a-16c about the respective steering axis 26a-26c and high requirements on rotational speed accuracy of the wheels 16a-16c about the respective wheel axis 24a-24c.

Although the AGV 10 of this example comprises three drive units 12, the calibration may be carried out with only two drive units 12. For example, the calibration may be carried out with an AGV 10 comprising two drive units 12 and a caster wheel. Prior to the calibration, the relative positions of the three wheels 16a-16c may be known with low accuracy.

With reference to FIG. 3a, a fixture 92 is secured to the level surface 18. A user is prompted to position the first wheel 16a in the fixture 92. To this end, the used may lift the AGV 10. For heavier AGVs 10, the fixture 92 may be openable such that the first wheel 16a can be positioned within the fixture 92 without having to lift the AGV 10. When the first wheel 16a is held in the fixture 92, the first steering axis 26a coincides with a center position 94 for the calibration.

When the first wheel 16a is locked in the fixture 92, the AGV 10 aims to position the second wheel 16b tangentially on an imaginary second circle 96b and position the third wheel 16c tangentially on an imaginary third circle 96c. Each of the second circle 96b and the third circle 96c is centered with respect to the center position 94. In the example in FIG. 3a, the second circle 96b is larger than third circle 96c. This is because the distance between the first wheel 16a and the second wheel 16b is larger than the distance between the first wheel 16a and the third wheel 16c.

In order to position the third wheel 16c tangentially on the third circle 96c when the first wheel 16a is locked in the fixture 92, the following steps may be carried out.

The steering position of the first wheel 16a about the first steering axis 26a is controlled based on a first target steering position. Thus, the steering motor 30 of the first drive unit 12a is put in position control holding the current position of the first wheel 16a about the first steering axis 26a.

The steering position of the second wheel 16b about the second steering axis 26b is controlled based on a second target steering position. Thus, the second wheel 16b is passive but its steering angle is held.

The wheel torque of the third wheel 16c about the third wheel axis 24c is controlled based on a third target wheel torque. Thus, the third wheel 16c is put in torque control about the third wheel axis 24c with a predefined torque as reference. The predefined torque may be positive. In general, the predefined torque of the wheel motor 28 of the third wheel 16c may be set as high as possible without risking slippage of the wheels 16.

The third wheel 16c is then rotated about the third steering axis 26c over a third steering axis range 98c. The steering angle of the third wheel 16c may for example be swept ±5 degrees. As the third wheel 16c is rotated about the third steering axis 26c, the torque in the steering motor 30 of the first wheel 16a is observed, e.g. based on currents in the steering motor 30. If the maximum torque in the steering motor 30 is observed when the third wheel 16c is positioned at an end of the third steering axis range 98c, this position may be set as a new reference position, and the rotation of the third wheel 16c about the third steering axis 26c may be iteratively repeated with the new reference positioned centered in an adjusted third steering axis range 98c. Otherwise, it is concluded that the position of the third wheel 16c about the third steering axis 26c where the maximum torque in the steering motor 30 of the first wheel 16a is observed is tangential to the second circle 96b. This position of the third wheel 16c is where the lever arm reaches its maximum length and a normal to the wheel heading intersects the center position 94. When the third wheel 16c is swept, the length of the lever arm from the wheel motor 28 of the third wheel 16c to the first wheel 16a will change.

The method is then repeated for the second wheel 16b, i.e. by controlling the steering position of the third wheel 16c about the third steering axis 26c based on a third target steering position, by controlling the wheel torque of the second wheel 16b about the second wheel axis 24b based on a second target wheel torque, by rotating the second wheel 16b about the second steering axis 26b over a second steering axis range 98b (e.g. ±5 degrees), by observing the torque in the steering motor 30 of the first wheel 16a when the steering angle of the second wheel 16b is rotated, optionally by iteratively adjusting the second steering axis range 98b, and by determining that the second wheel 16b is positioned tangentially on the second circle 96b at a position about the second steering axis 26b where a maximum torque in the steering motor 30 of the first wheel 16a is observed.

FIG. 3b schematically represents an alternative way of positioning the second wheel 16b tangentially on the second circle 96b and/or to position the third wheel 16c tangentially on the third circle 96c. The fixture 92 in FIG. 3b differs from the fixture 92 in FIG. 3a by comprising a force sensing arrangement 100. The force sensing arrangement 100 is arranged to determine forces in a horizontal plane, i.e. parallel with the wheel axes 24a-24c. To this end, the force sensing arrangement 100 comprises a plurality of force sensors 102, for example strain gauges. As an alternative, a corresponding force sensing arrangement may be provided in each of the first wheel 16a, the second wheel 16b and the third wheel 16c.

In order to position the second wheel 16b tangentially on the second circle 96b and/or to position the third wheel 16c tangentially on the third circle 96c when the first wheel 16a is locked in the fixture 92, the following steps may be carried out.

The steering position of the second wheel 16b about the second steering axis 26b is controlled based on a second target steering position. The steering position of the third wheel 16c about the third steering axis 26c is controlled based on a third target steering position. Thus, the AGV 10 holds the steering positions of the second wheel 16b and the third wheel 16c.

The support structure 14 is then rotated relative to the first wheel 16a over a first steering axis range 98a. This can be done by controlling the wheel torque of the second wheel 16b about the second wheel axis 24b and/or by controlling the wheel torque of the third wheel 16c about the third wheel axis 24c. During the rotation of the support structure 14, the steering motor 30 of the first wheel 16a may be controlled by a proportional-integral-derivable (PID) controller. The output from the PID controller is sent to the wheel motors 28 of the second wheel 16b and the third wheel 16c. This is because it requires lower torques to rotate the support structure 14 by means of one or both wheel motors 28 of the second wheel 16b and the third wheel 16c, than by the steering motor 30 of the first wheel 16a.

During the rotation of the support structure 14, a force vector in the XY-plane determined by the force sensing arrangement 100 is observed. Depending on the size and towards which of the second wheel 16b and the third wheel 16c the vector is mainly pointing, the steering angle of that wheel is changed. For example, if the force vector mainly points towards the second wheel 16b, the rotation of the second wheel 16b about the second steering axis 26b is adjusted. A force vector pointing towards the second wheel 16b is created if the heading direction of the second wheel 16b is not tangent with the second circle 96b. The second wheel 16b will then generate a push or pull on the first wheel 16a during the rotation of the support structure 14. This method may then be repeated until the force vector is less than a predefined value.

With reference to FIG. 4, when the second wheel 16b is positioned tangentially on the second circle 96b and the third wheel 16c is positioned tangentially on the third circle 96c, the following steps are carried out. FIG. 4 shows the same fixture 92 as in FIG. 3a. Thus, in this example, the second wheel 16b and the third wheel 16c have been positioned tangentially on a respective circle 96b and 96c by using a fixture 92 not necessarily comprising a force sensing arrangement 100. However, the following steps are equally applicable with the fixture 92 in FIG. 3b.

With reference to FIG. 4, the second wheel 16b is driven a second distance 104b along the second circle 96b and the third wheel 16c is driven a third distance 104c along the third circle 96c. The support structure 14 thereby rotates about the center position 94 and about the first steering axis 26a. The support structure 14 may for example be rotated by means of torque control of the wheel motors 28 of the second wheel 16b and the third wheel 16c based on target torque references from a position controller associated with the steering motor 30 of the first wheel 16*a*, and by commanding the steering angle of the first wheel 16*a* to move to a predefined position.

During the rotation of the support structure 14, the second distance 104*b* can be determined based on data from the wheel sensor device 74 of the second wheel 16*b*, the third distance 104*c* can be determined based on data from the wheel sensor device 74 of the third wheel 16*c*, and an angle of rotation 106*a* of the support structure 14 can be determined based on data from the steering sensor device 46 of the first wheel 16*a*.

The second distance 104*b* is dependent on the distance between the first wheel 16*a* and the second wheel 16*b* and the third distance 104*c* is dependent on the distance between the first wheel 16*a* and the third wheel 16*c*. The distance between the first wheel 16*a* and the second wheel 16*b* can then be determined by dividing the second distance 104*b* with the angle of rotation 106*a*, e.g. by means of an algorithm in the central control system 20. The distance between the first wheel 16*a* and the third wheel 16*c* can then be determined by dividing the third distance 104*c* with the angle of rotation 106*a*, e.g. by means of an algorithm in the central control system 20. The radius, diameter or circumference of each wheel 16 may be known beforehand, or may be calculated with known methods.

The method may then be repeated by placing the second wheel 16*b* in the fixture 92 in order to determine the distance between the second wheel 16*b* and the third wheel 16*c*. The method may also be repeated by placing the third wheel 16*c* in the fixture 92. In this case, average distances between the wheels 16*a*-16*c* can determined to further improve accuracy. For an AGV 10 comprising n wheels 16, the method has to be carried out at least n−1 times, where n is a positive integer.

All steps of the method may be automated, e.g. commanded by the central control system 20. In some variants, the step of positioning a wheel 16 in the fixture 92 can be done with human involvement.

FIGS. 5*a*, 5*b*, 6*a*, 6*b*, 7*a*, 7*b*, 8*a*, 8*b*, 9*a* and 9*b* schematically represent an AGV 10 in a second example of calibrating positions of wheels 16 of the AGV 10. The AGV 10 comprises a support structure 14 and three drive units 12*a*-12*c* connected to the support structure 14. The positions of the wheels 16*a*-16*c* relative to the support structure 14 are only roughly known. Each drive unit 12*a*-12*c* is of the same type as in FIG. 2. The shape of the support structure 14 is different than in FIGS. 3*a*, 3*b* and 4.

Figure 5A:
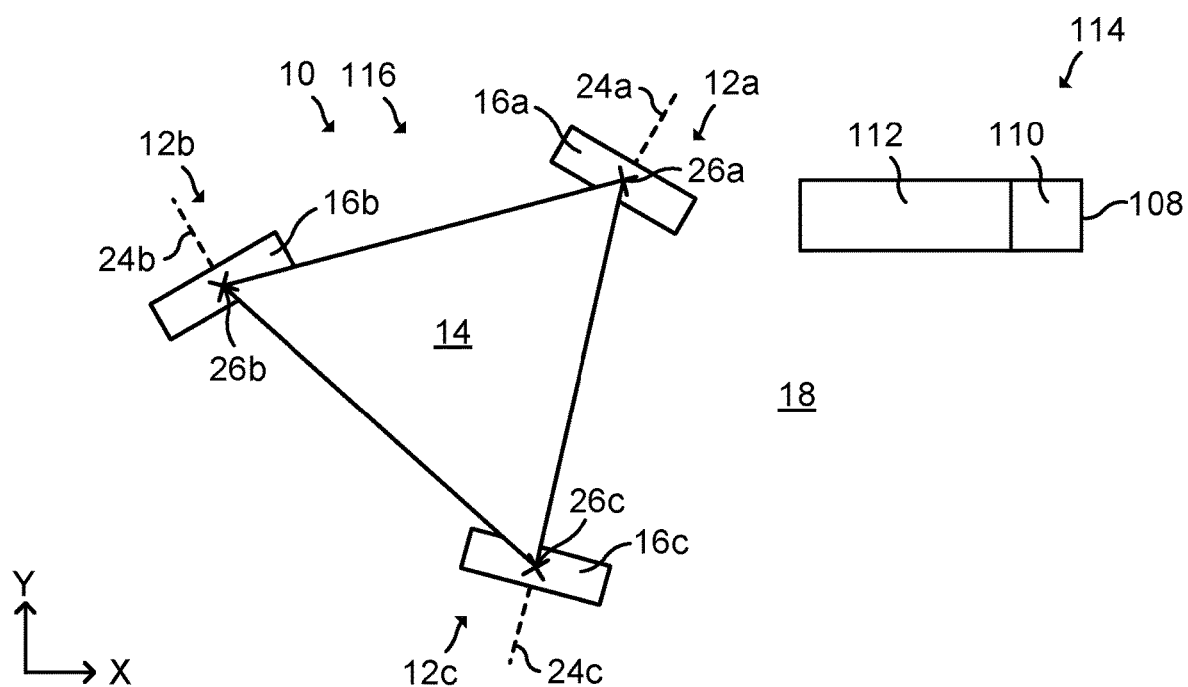
FIGS. 5a, 5b, 6a, 6b, 7a, 7b, 8a, 8b, 9a and 9b schematically represent an AGV in a second example of calibration.
Figure 5B:
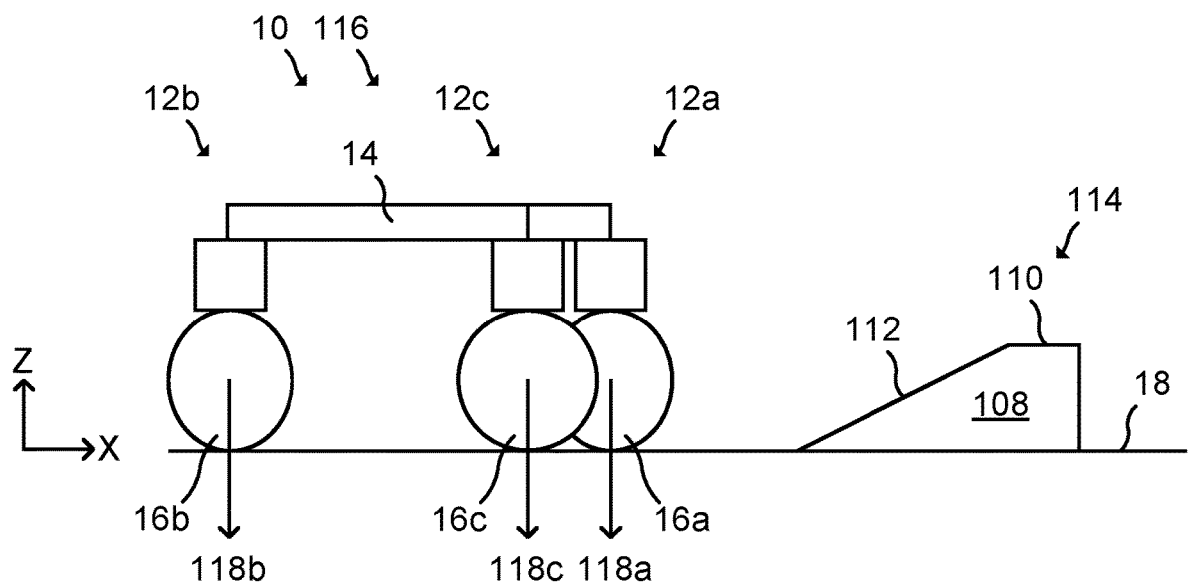

With reference to FIGS. 5*a* and 5*b*, a ramp 108 is placed on the level surface 18. The ramp 108 comprises a flat top surface 110 and an inclined surface 112. The inclined surface 112 leads from the level surface 18 to the top surface 110. The ramp 108 and the level surface 18 form one example of a geometric arrangement 114. Each wheel 16*a*-16*c* is positioned on the level surface 18. The AGV 10 is thereby positioned in a first AGV position 116 in relation to the geometric arrangement 114.

As shown in FIG. 5*b*, when the AGV 10 is positioned in the first AGV position 116 on the level surface 18, a reference gravity vector 118*a*-118*c* is determined for at least one drive unit 12*a*-12*c*. In FIG. 5*b*, a reference gravity vector 118*a*-118*c* is determined for each drive unit 12*a*-12*c*, but one gravity vector 118*a*-118*c* is sufficient. The gravity vectors 118*a*-118*c* are determined by means of the accelerometer 90 in the respective drive unit 12*a*-12*c*. Only the directions, and not the lengths, of the gravity vectors 118*a*-118*c* are needed. Thus, each drive unit 12 may employ a cheap accelerometer 90 for relative measurements. In case it is known that the level surface 18 is perfectly horizontal, this step of determining the gravity vectors 118*a*-118*c* by means of the accelerometers 90 may be omitted.

Figure 6A:
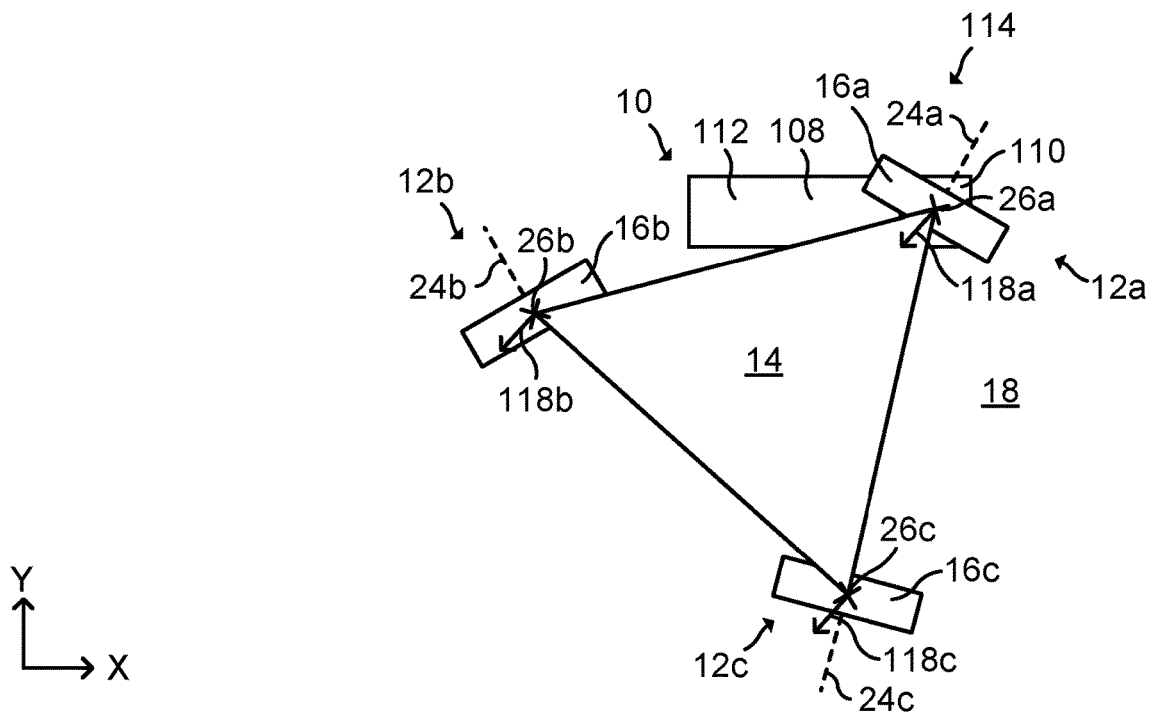
Figure 6B:
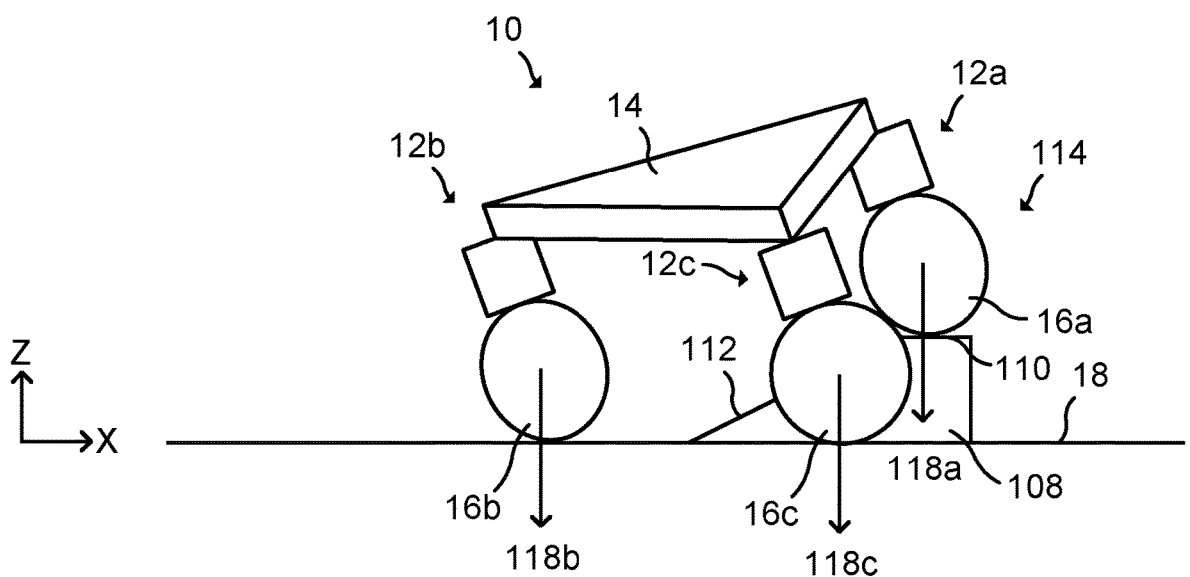

In FIGS. 6*a* and 6*b*, the first wheel 16*a* has been raised with respect to the level surface 18. In this example, the first wheel 16*a* is positioned on the top surface 110 of the ramp 108. As shown in FIG. 6*a*, the gravity vectors 118*a*-118*c* are not aligned with the wheels 16*a*-16*c*. The AGV 10 therefore rotates the wheels 16*a*-16*c* about the respective steering axis 26*a*-26*c* until the wheels 16*a*-16*c* are aligned with the respective gravity vector 118*a*-118*c*.

Figure 7A:
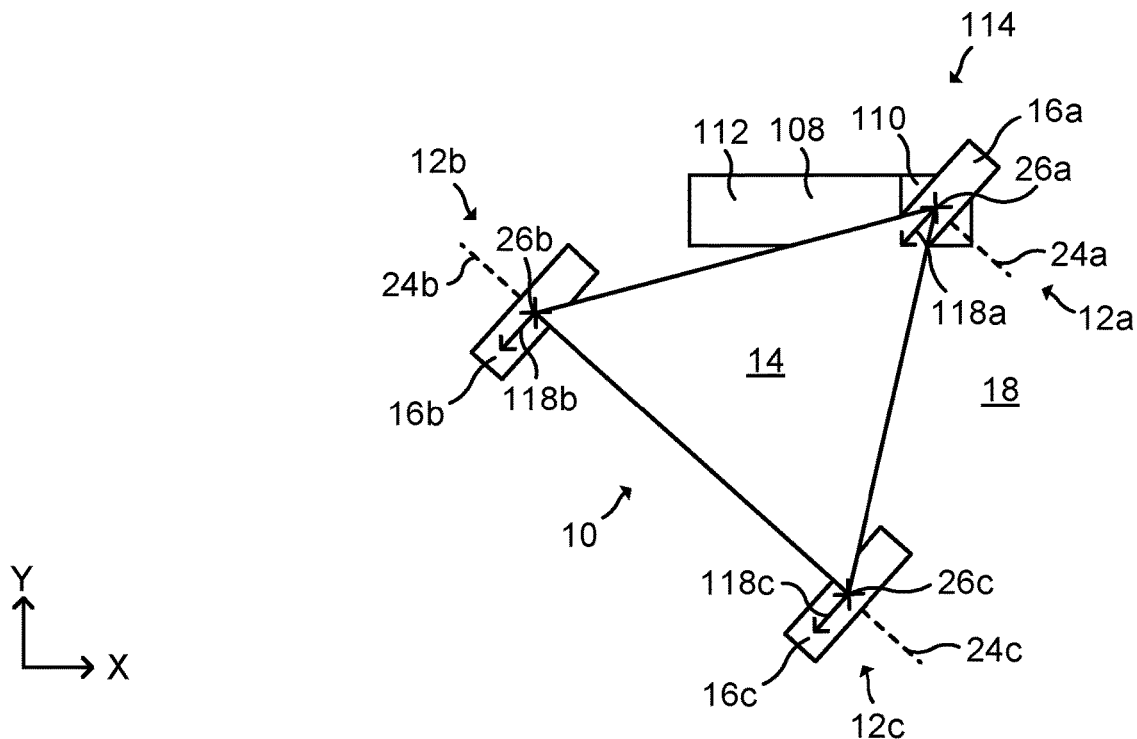
Figure 7B:
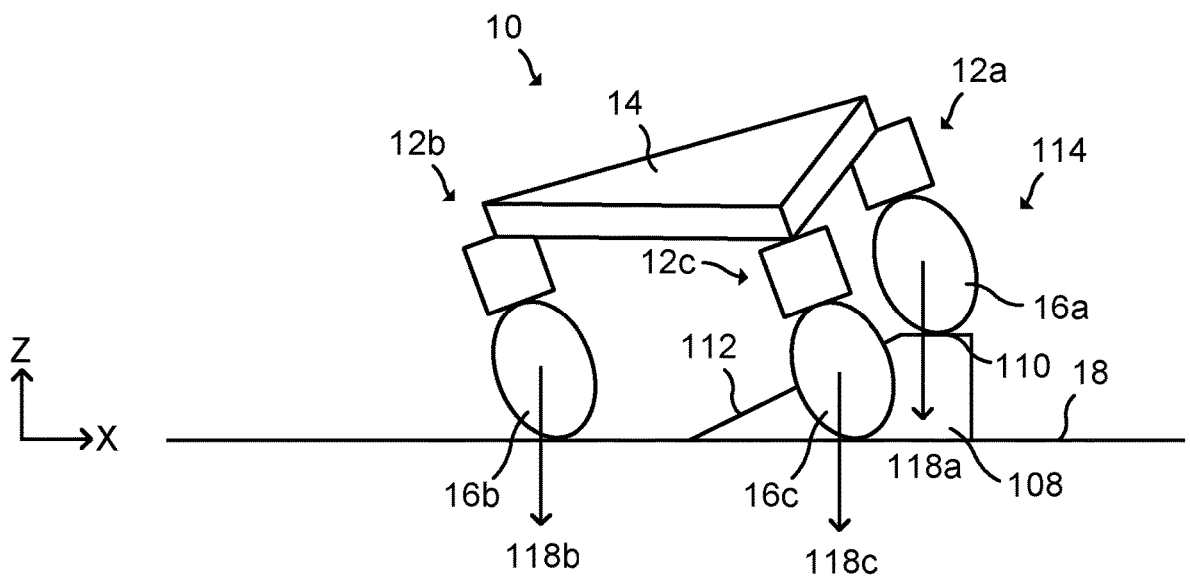

FIGS. 7*a* and 7*b* show the wheels 16*a*-16*c* after alignment with the respective gravity vector 118*a*-118*c*. By aligning the wheels 16-16*c* with the respective gravity vector 118*a*-118*c*, the wheels 16*a*-16*c* are positioned in parallel. As shown in FIGS. 7*a* and 7*b*, each gravity vector 118*a*-118*c* lies in the plane of the associated wheel 16*a*-16*c* and points backwards. The second wheel axis 24*b* and the third wheel axis 24*c* are now coincident.

Figure 8A:
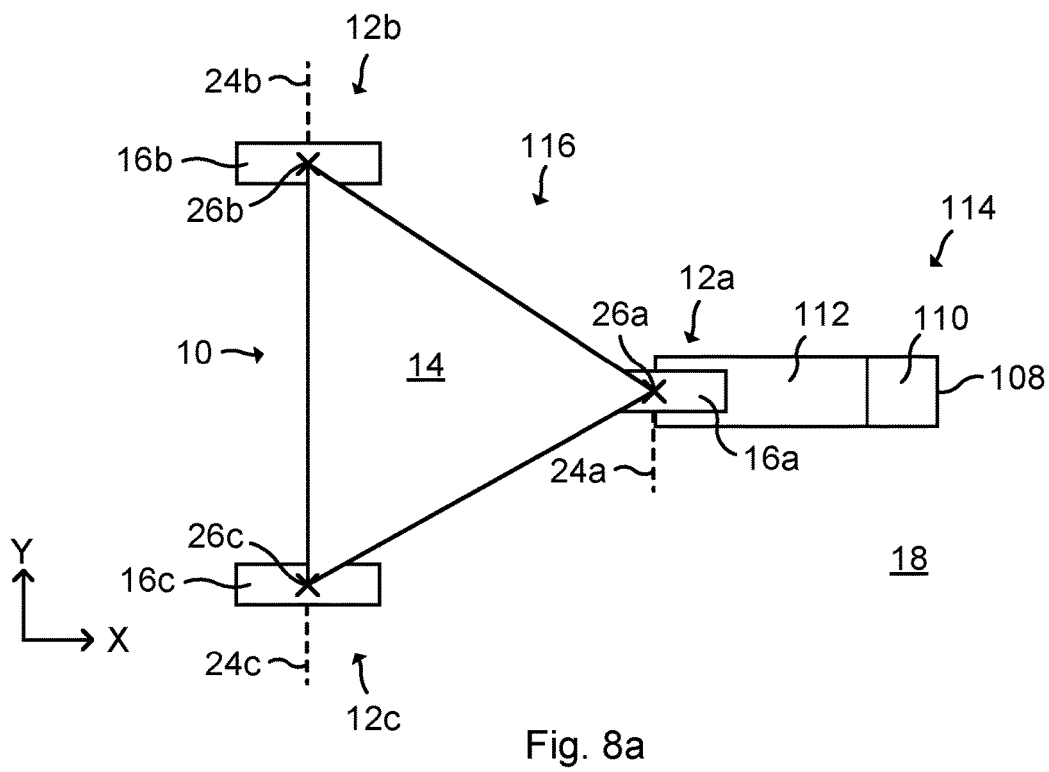
Figure 8B:
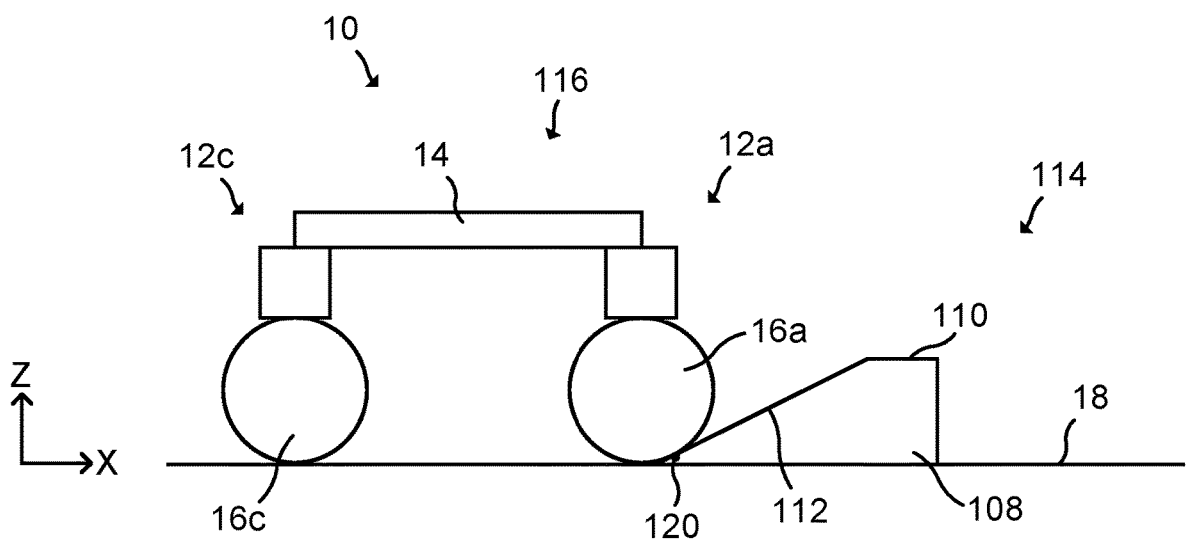

FIGS. 8*a* and 8*b* show the AGV 10 in the first AGV position 116 again, but now the wheels 16*a*-16*c* are parallel. All wheels 16*a*-16*c* are parallel with the inclined surface 112 of the ramp 108, i.e. with a main extension direction of the inclined surface 112. The second wheel 16*b* and the third wheel 16*c* are in contact with the level surface 18 and the first wheel 16*a* is in contact with a first inclined position 120 on the inclined surface 112. In this example, the first wheel 16*a* is additionally in contact with the level surface 18. The AGV 10 may be moved to this position relative to the ramp 108. Alternatively, the ramp 108 may be manually moved to the first wheel 16*a*.

When the first wheel 16*a* is in contact with the first inclined position 120 on the inclined surface 112, first AGV position data is obtained from at least two drive units 12*a*-12*c*. In this example, the first AGV position data comprises data from the wheel sensor device 74 of each drive unit 12*a*-12*c* in the first AGV position 116. The AGV 10 now starts to drive such that the first wheel 16*a* moves along the inclined surface 112 and the second wheel 16*b* and the third wheel 16*c* move along the level surface 18.

Figure 9A:
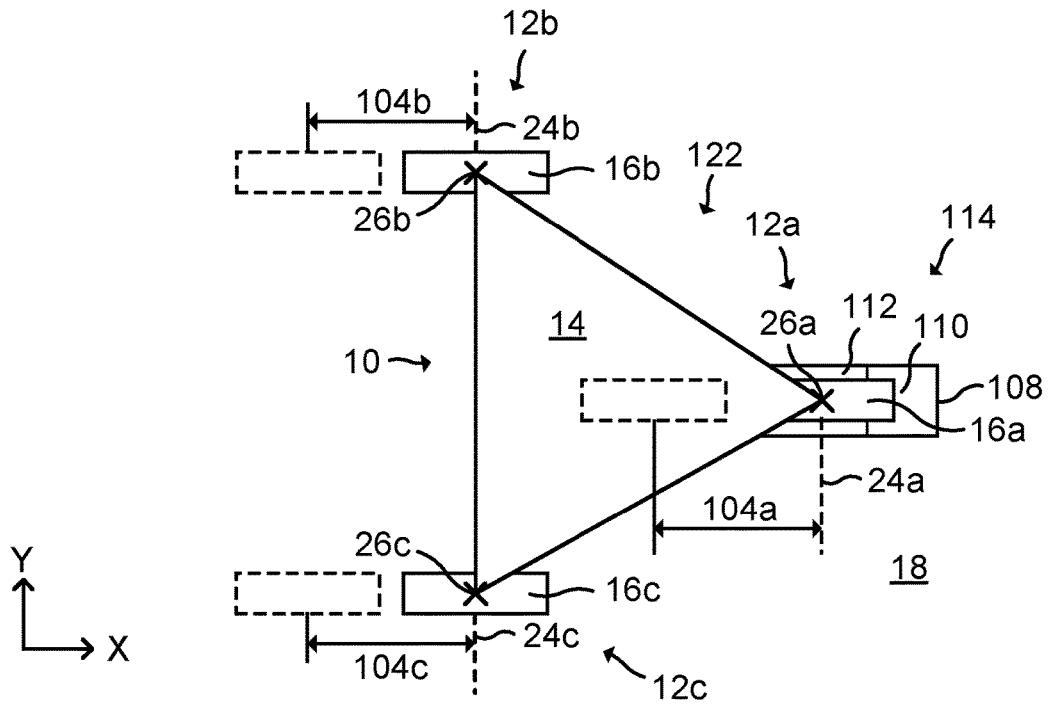
Figure 9B:
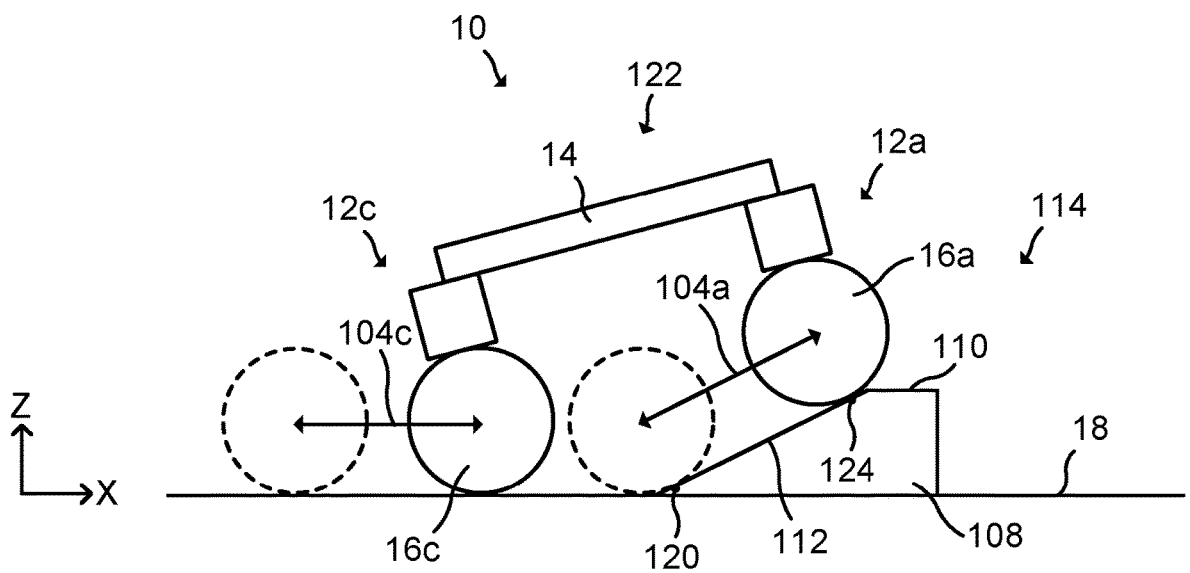

FIGS. 9*a* and 9*b* show the AGV 10 in a second AGV position 122 in relation to the geometric arrangement 114. The first wheel 16*a* has moved a first distance 104*a* along the inclined surface 112 from the first inclined position 120 to a second inclined position 124. The second wheel 16*b* has moved a second distance 104*b* along the level surface 18 and the third wheel 16*c* has moved a third distance 104*c* along the level surface 18.

The second distance 104*b* and the third distance 104*c* are equal. Thus, only data from the wheel sensor device 74 of one of the second drive unit 12*b* and the third drive unit 12*c* may be collected. The first distance 104*a* is longer than the second distance 104*b* or the third distance 104*c*. This difference is a function of the inclination of the inclined surface 112 and a distance from the first wheel 16*a* to a line between the second wheel 16*b* and the third wheel 16*c*.

In the second AGV position 122, second AGV position data is obtained from each drive unit 12*a*-12*c*. In this example, the second AGV position data comprises data from the wheel sensor device 74 of each drive unit 12*a*-12*c* in the second AGV position 122. Again, only data from the wheel sensor device 74 of the first drive unit 12*a* and one of the second drive unit 12*b* and the third drive unit 12*c* is however needed.

Based on the data from each wheel sensor device 74 in the first AGV position 116 and the second AGV position 122, the first distance 104a, the second distance 104b and the third distance 104c can be determined. In order to do this, it is assumed that the radius, diameter or circumference of each wheel 16a-16c is known. It is also assumed that the inclination of the inclined surface 112 is known. Otherwise, the inclination of the inclined surface 112 may be determined in various ways.

Based on the distances 104a-104c and the inclination of the inclined surface 112, a distance from the first wheel 16a to a line between the second wheel 16b and the third wheel 16c can be calculated. The above method is then repeated twice, i.e. by raising the second wheel 16b, positioning the wheels 16a-16c in parallel, driving up the inclined surface 112 with the second wheel 16b, determining a distance from the second wheel 16b to a line between the first wheel 16a and the third wheel 16c, raising the third wheel 16c, positioning the wheels 16a-16c in parallel, driving up the inclined surface 112 with the third wheel 16c, and determining a distance from the third wheel 16c to a line between the first wheel 16a and the second wheel 16b. The distances between the wheels 16a-16c can then be determined based on the distances from each wheel 16a-16c to a respective line between the respective other two wheels 16a-16c, e.g. by means of an algorithm in the central control system 20.

All steps of the method in FIGS. 5a to 9b may be automated, e.g. commanded by the central control system 20. In case the method in FIGS. 5a to 9b is carried out with an AGV 10 comprising more than three drive units 12, a small torque may be applied to the wheel motors 28 of the wheels 16 to see which wheel 16 is in free air when one wheel 16 is raised. The free wheel 16 will then spin.

FIGS. 10a, 10b, 11a, 11b, 12a and 12b schematically represent an AGV 10 in a third example of calibrating positions of wheels 16 of the AGV 10. The AGV 10 is of the same type as in FIGS. 5a to 9b.

Figure 10A:
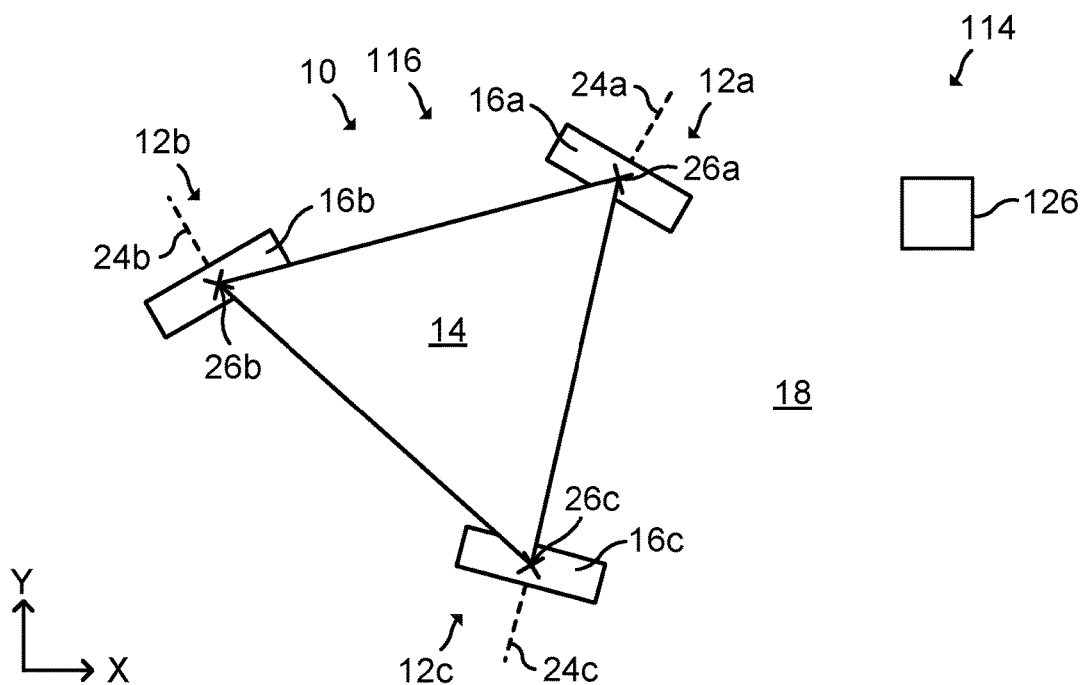
FIGS. 10a, 10b, 11a, 11b, 12a and 12b schematically represent an AGV in a third example of calibration.
Figure 10B:
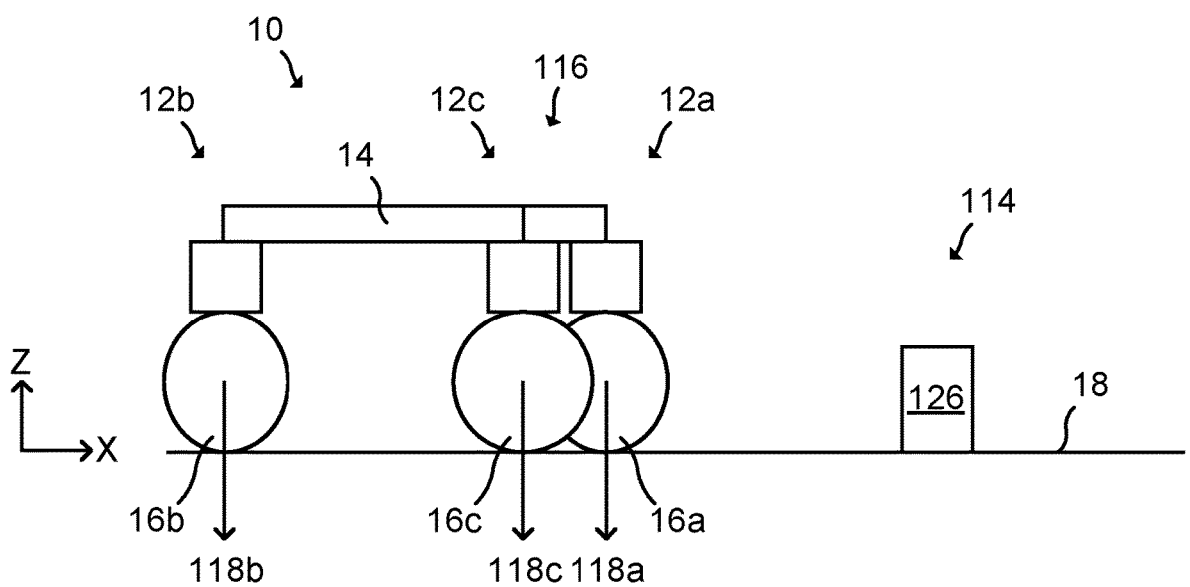

With reference to FIGS. 10a and 10b, a box 126 is placed on the level surface 18. The height of the box 126 is known. The box 126 constitutes one example of a support object. The box 126 and the level surface 18 form a further example of a geometric arrangement 114. Each wheel 16a-16c is positioned on the level surface 18. The AGV 10 is thereby positioned in a first AGV position 116 in relation to the geometric arrangement 114.

As shown in FIG. 10b, when the AGV 10 is positioned in the first AGV position 116, a reference gravity vector 118a-118c is determined for at least one drive unit 12a-12c.

The gravity vectors 118a-118c are determined by means of the accelerometer 90 in the respective drive unit 12a-12c. In this example, the gravity vectors 118a-118c of the drive units 12a-12c also constitute first AGV position data obtained in the first AGV position 116. However, the first AGV position data does only need to comprise the gravity vector 118a-118c of one of the wheels 16a-16c. In this example, three gravity vectors 118a-118c are determined, but one is sufficient. It is also possible to omit the step of determining gravity vectors 118a-118c by the accelerometers 90 if it is known that the level surface 18 is perfectly horizontal.

Figure 11A:
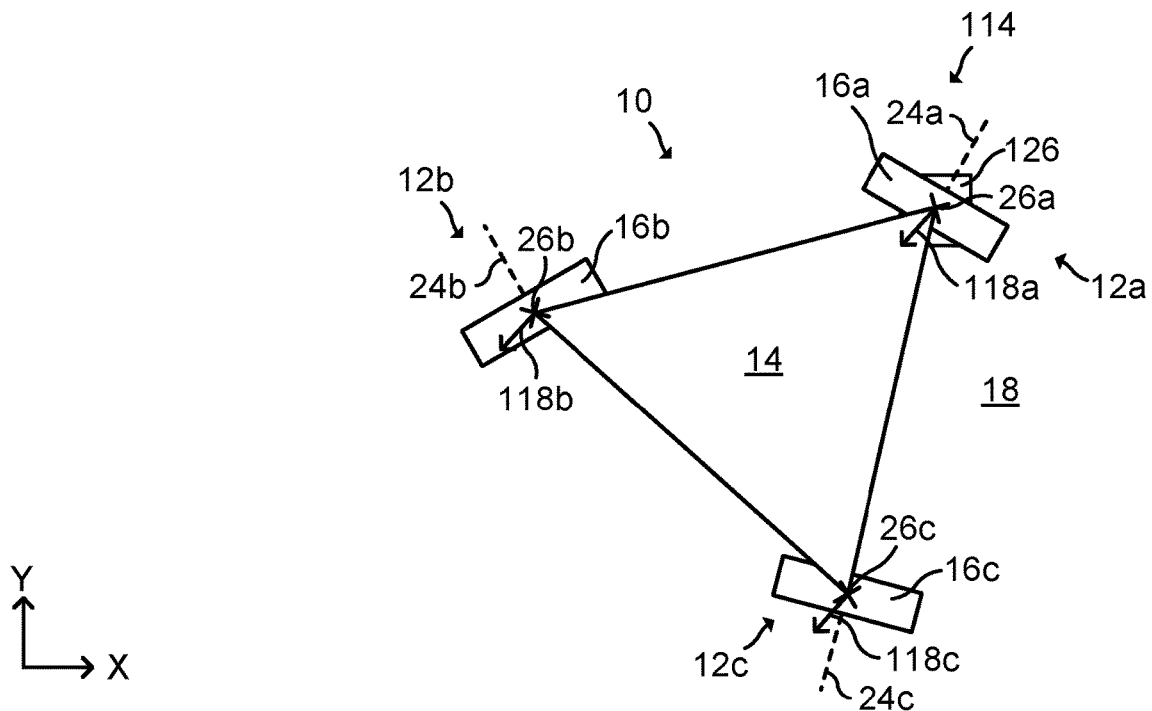
Figure 11B:
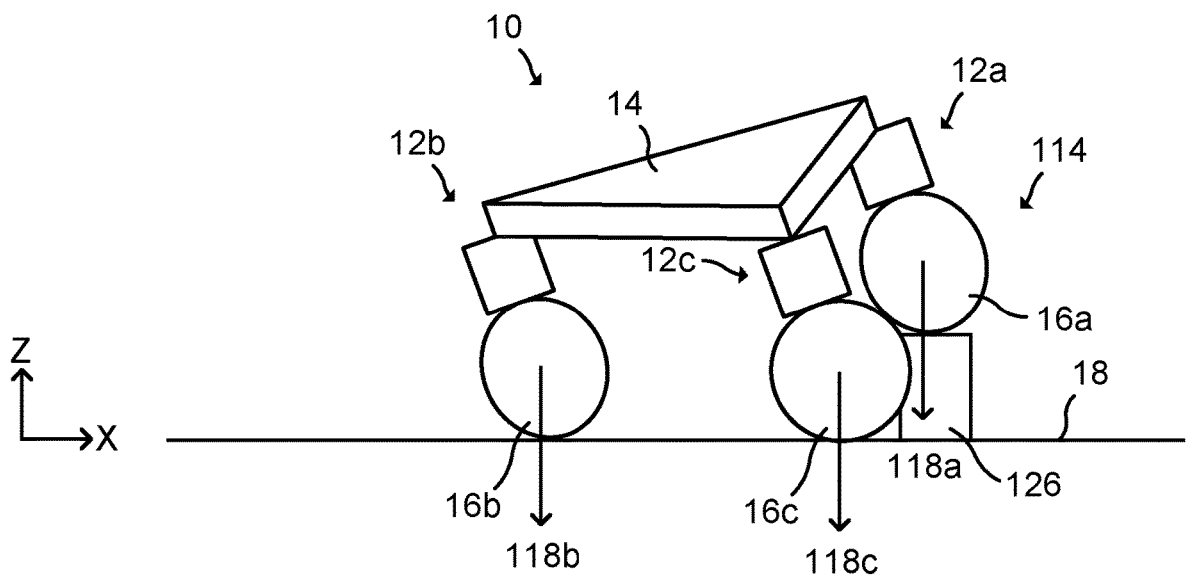

In FIGS. 11a and 11b, the first wheel 16a has been raised with respect to the level surface 18. In this example, the first wheel 16a is positioned on the box 126, e.g. by lifting the first wheel 16a and putting the box 126 under the first wheel 16a. As shown in FIG. 11a, the gravity vectors 118a-118c are not aligned with the wheels 16a-16c. The AGV 10 therefore rotates the wheels 16a-16c about the respective steering axis 26a-26c until the wheels 16a-16c are aligned with the respective gravity vector 118a-118c.

Figure 12A:
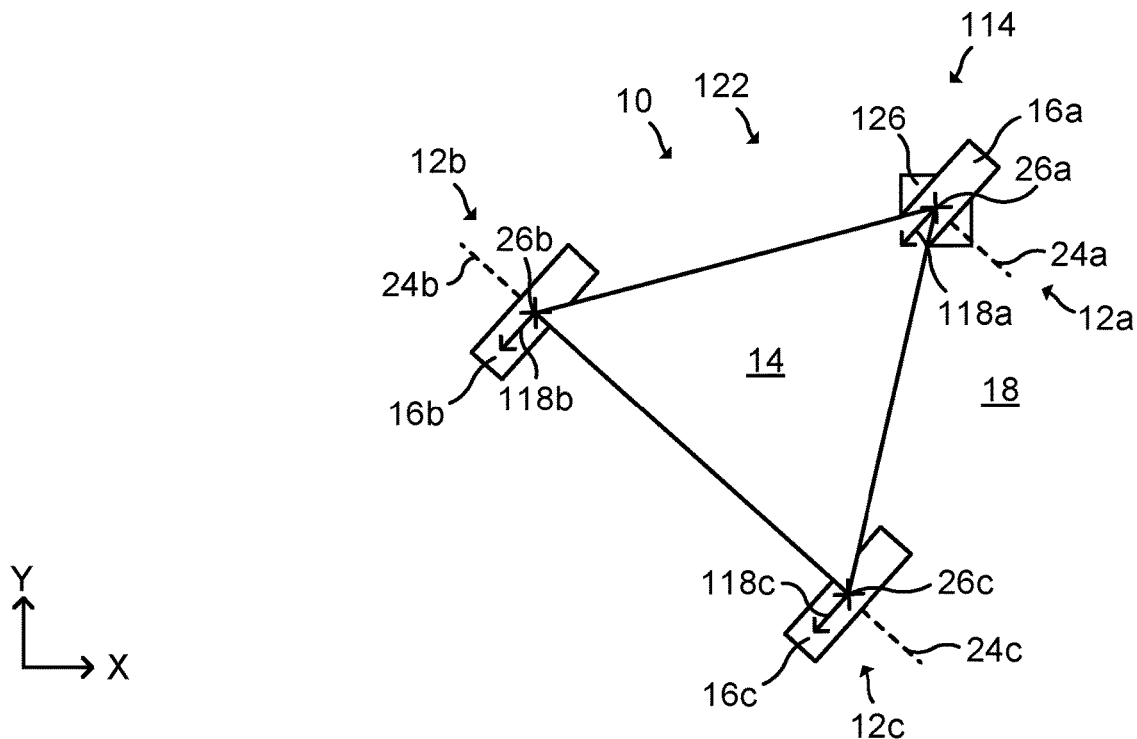
Figure 12B:
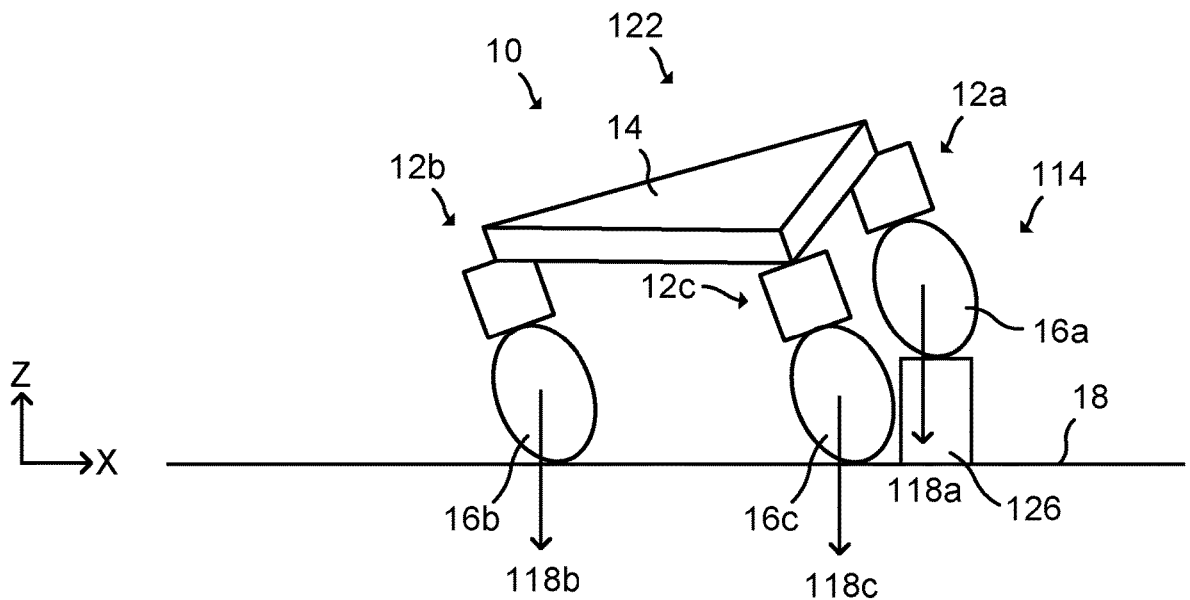

FIGS. 12a and 12b show the wheels 16a-16c after alignment with the respective gravity vector 118a-118c. By aligning the wheels 16a-16c with the respective gravity vector 118a-118c, the wheels 16a-16c are positioned in parallel. As shown in FIGS. 12a and 12b, each gravity vector 118a-118c lies in the plane of the associated wheel 16a-16c and points backwards. The second wheel axis 24b and the third wheel axis 24c are now coincident.

In FIGS. 12a and 12b, The AGV 10 is positioned in a second AGV position 122 in relation to the geometric arrangement 114. The first wheel 16a is still positioned on the box 126. In the second AGV position 122, second AGV position data is obtained from at least one drive unit 12. In this example, the second AGV position data is obtained from the accelerometer 90 of at least one drive unit 12. The data from the accelerometer 90 of each drive unit 12 represents the tilt angle of the AGV 10.

Based on the gravity vector 118a-118c of at least one drive unit 12 obtained in the first AGV position 116, the gravity vector 118a-118c of at least one drive unit 12 in the second AGV position 122, and the height of the box 126, a distance from the first wheel 16a to a line between the second wheel 16b and the third wheel 16c can be determined.

The above method is then repeated twice, i.e. by raising the second wheel 16b, positioning the wheels 16a-16c in parallel, obtaining data from at least one accelerometer 90, determining a distance from the second wheel 16b to a line between the first wheel 16a and the third wheel 16c, raising the third wheel 16c, positioning the wheels 16a-16c in parallel, obtaining data from at least one accelerometer 90, and determining a distance from the third wheel 16c to a line between the first wheel 16a and the second wheel 16b. The distances between the wheels 16a-16c can then be determined based on the distances from each wheel 16a-16c to a respective line between the respective other two wheels 16a-16c, e.g. by means of an algorithm in the central control system 20. The box 126 can easily be moved by hand to a respective wheel 16 to be raised.

FIGS. 13a, 13b, 14a and 14b schematically represent an AGV 10 in a fourth example of calibrating positions of wheels 16 of the AGV 10. The AGV 10 in this example comprises a first drive unit 12a with a first wheel 16a, a second drive unit 12b with second wheel 16b, a third drive unit 12c with a third wheel 16c, and a fourth drive unit 12d with a fourth wheel 16d. Each drive unit 12a-12d is connected to a support structure 14 and is of the same type as in FIG. 2. The support structure 14 of this example is a frame, for example built from extruded aluminium profiles. The drive units 12a-12d are placed on a square.

Figure 13A:
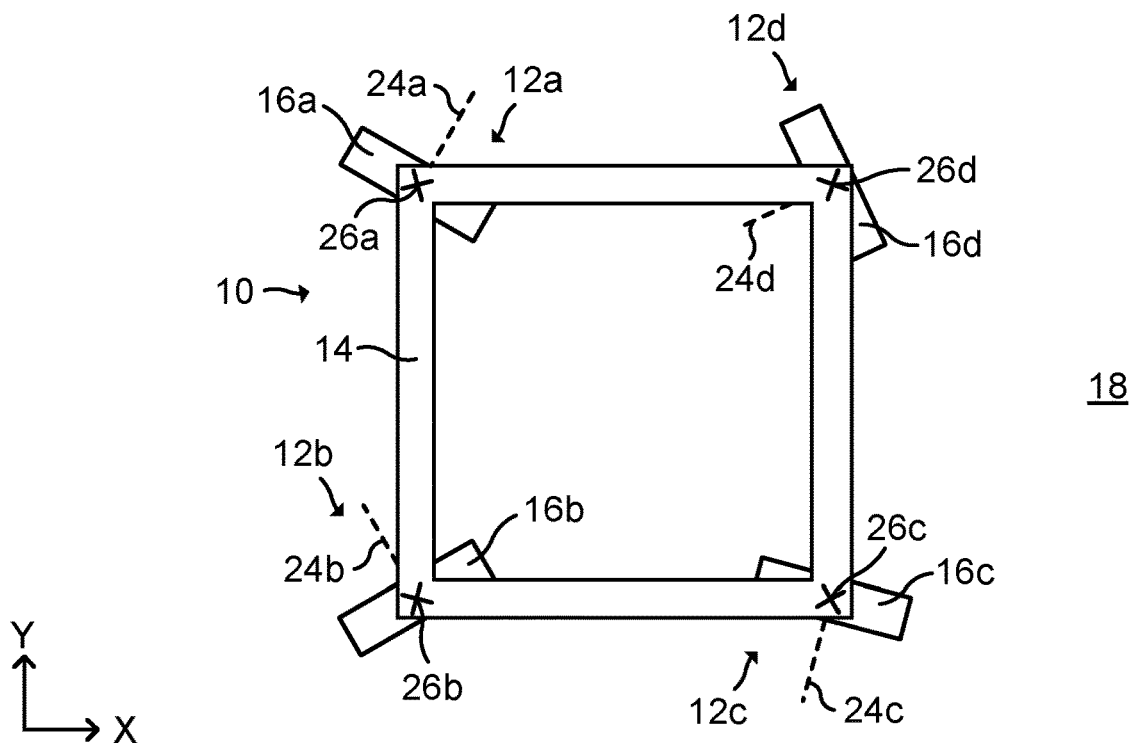
FIGS. 13a, 13b, 14a, 14b and 14c schematically represent an AGV in a fourth example of calibration.

FIG. 13a shows the AGV 10 at start-up. In FIG. 13a, the absolute positions of the wheels 16a-16d about the respective steering axis 26a-26d and the absolute positions of the wheels 16a-16d about the respective wheel axis 24a-24d are unknown. In order to determine these absolute positions, the following steps can be carried out.

Figure 13B:
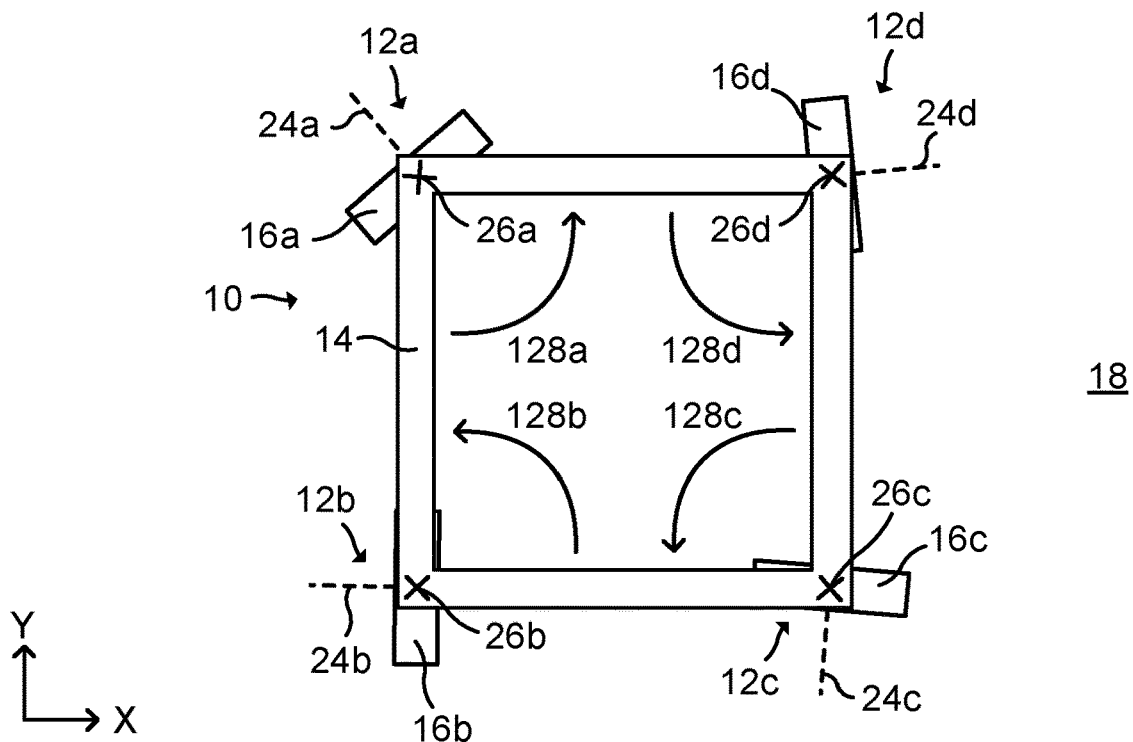

As shown in FIG. 13b, each wheel 16a-16d is rotated about the respective steering axis 26a-26d as indicated with arrows 128a-128d until a respective steering homing switch 56 is triggered. In this way, each steering motor 30 is homed. Each wheel 16a-16d may have to rotate a different angular distance about the respective steering axis 26a-26d until an associated steering homing switch 56 is triggered. After a steering homing switch 56 has been triggered, the associated wheel 16a-16d may stop.

An absolute steering position of each wheel 16a-16d about the respective steering axis 26a-26d is then determined based on data from the respective steering sensor device 46 when the steering homing switch 56 is triggered. The absolute positions of the wheels 16a-16d about the respective steering axes 26a-26d are now known.

Figure 14A:
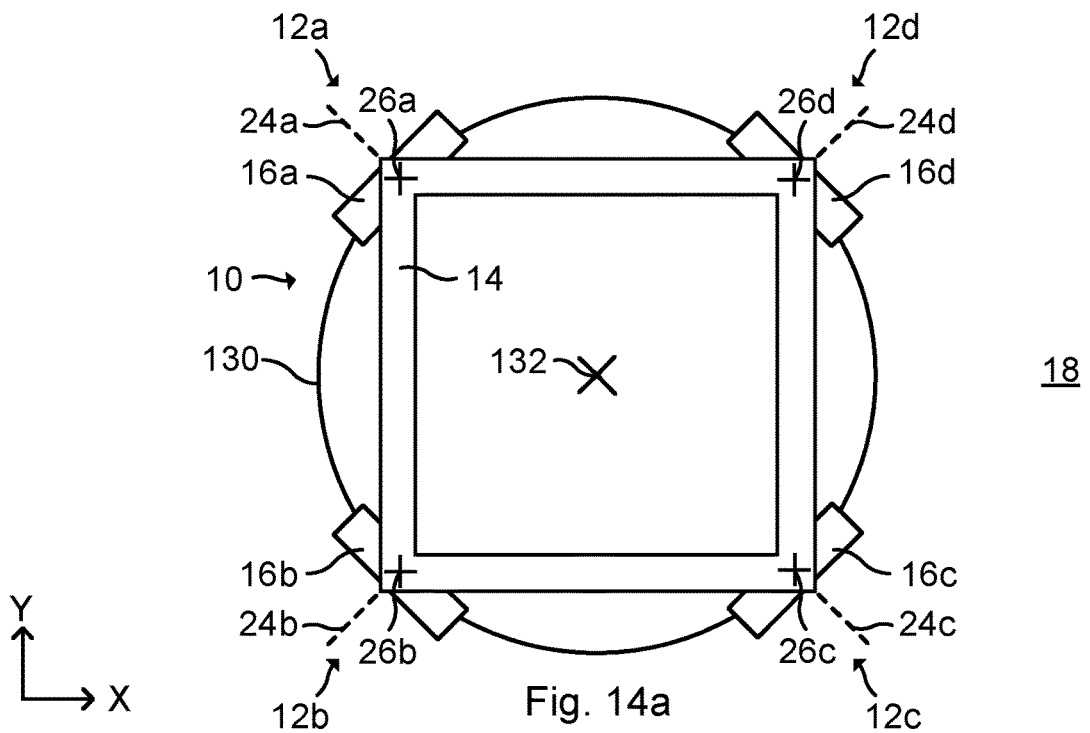

With reference to FIG. 14a, after determining these absolute steering positions, each wheel 16a-16d is aligned on a path 130. The path 130 of this example is a circle. When the wheels 16a-16d are aligned with the path 130, the wheels 16a-16d are driven by the respective wheel motor 28 to rotate about the wheel axes 24a-24d. The wheels 16a-16d may however be positioned in valid configurations other than on a circle.

Figure 14B:
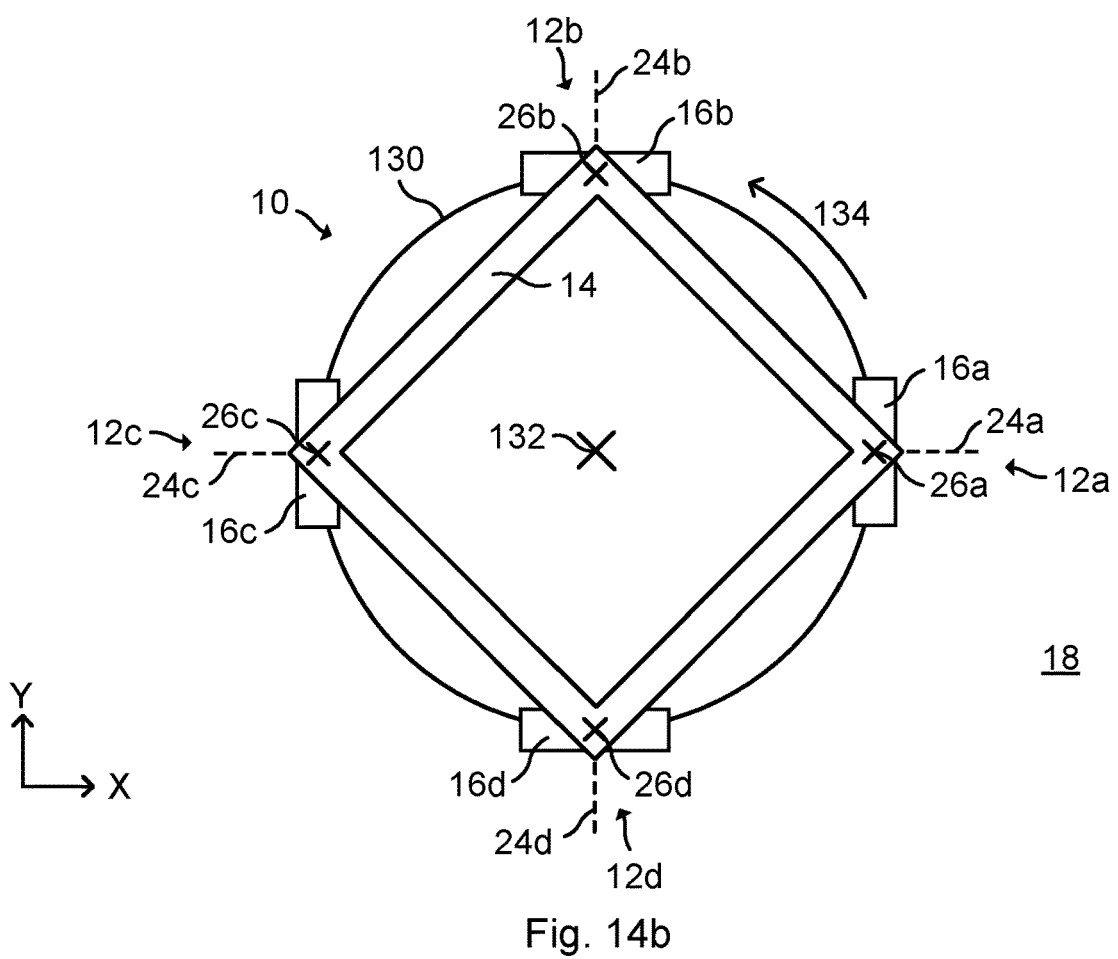

As shown in FIG. 14b, the AGV 10 thereby rotates about a rotation point 132 as indicated with arrow 134. The rotation of the AGV 10 continues until the wheel homing switches 84 of all wheels 16a-16d have been triggered. In this way, each wheel motor 28 is homed. After all wheel homing switches 84 have been triggered, the AGV 10 may stop its rotation about the rotation point 132.

An absolute wheel position of each wheel 16a-16d about the respective wheel axis 24a-24d is then determined based on data from the respective wheel sensor device 74 when the wheel homing switch 84 is triggered. Also, the absolute positions of the wheels 16a-16d about the respective wheel axes 24a-24d are now known.

Figure 14C:
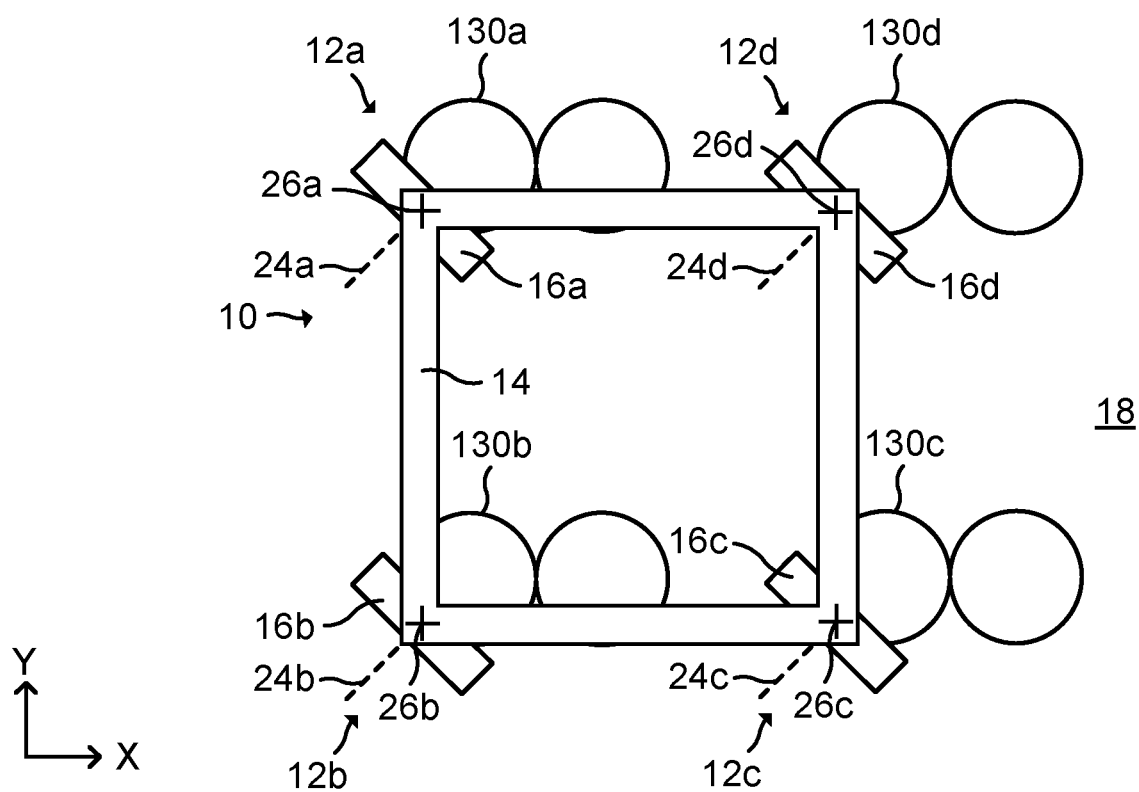

FIG. 14c shows an alternative to the path 130 in FIG. 14b. In FIG. 14c, each wheel 16a-16d is driven to follow a respective 8-shaped path 130a-130d until all wheel motors 28 are homed. In this case, the AGV 10 does not rotate in the XY-plane. An advantage with the variant in FIG. 14c is that each wheel 16a-16d only needs to rotate ±180 degrees about the respective steering axis 26a-26d. This may be useful for AGVs 10 where cables to the wheels 16 limit rotation about the respective steering axis 26a-26.

The above method for determining absolute positions of the wheels 16a-16d about the steering axes 26a-26d and about the wheel axes 24a-24d may be initiated and performed automatically during each start-up of the AGV 10. The method can be carried out in a small space.

The four wheels 16a-16d of the AGV 10 in FIGS. 13a to 14c can also be calibrated with any of the three methods in FIGS. 3a to 12b. Furthermore, each of the calibration methods in FIGS. 3a to 14c can be performed with AGVs 10 comprising three, four or more drive units 12.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of calibrating positions of wheels in an automated guided vehicle, AGV, the AGV comprising a support structure and at least two drive units connected to the support structure, wherein each drive unit comprises:
   a wheel rotatable about a wheel axis and about a steering axis perpendicular to the wheel axis;
   a wheel motor arranged to drive the wheel about the wheel axis;
   a wheel sensor device arranged to determine a rotational position of the wheel about the wheel axis;
   a steering motor arranged to drive the wheel about the steering axis; and
   a steering sensor device arranged to determine a rotational position of the wheel about the steering axis;
   wherein the method comprises:
   positioning a second wheel tangentially on an imaginary second circle centered with respect to a center position in which a first wheel is fixed;
   driving the second wheel a second distance along the second circle such that the AGV rotates about the center position;
   determining the second distance based on data from the second wheel sensor device of the second wheel;
   determining an angle of rotation about the center position based on data from the first steering sensor device of the first wheel during the rotation of the AGV; and
   determining relative positions between the first wheel and the second wheel based on the second distance and the angle of rotation.

2. The method according to claim 1, wherein the AGV comprises at least three drive units, and wherein the method comprises:
   positioning a third wheel tangentially on an imaginary third circle centered with respect to the center position;
   driving the third wheel a third distance along the third circle at the same time as the second wheel is driven the second distance along the second circle;
   determining the third distance based on data from the wheel sensor device of the third wheel; and
   determining the relative positions between the first wheel and the third wheel based on the third distance and the angle of rotation.

3. The method according to claim 1, wherein the positioning of the second wheel tangentially on the second circle comprises:
   controlling the steering position of the first wheel about the first steering axis based on a first target steering position;
   controlling the wheel torque of the second wheel about the second wheel axis based on a second target wheel torque;
   rotating the second wheel about the second steering axis over a second steering axis range; and
   determining that the second wheel is positioned tangentially on the second circle at a position about the second steering axis where a maximum torque in the steering motor of the first wheel is observed.

4. The method according to claim 1, wherein the first wheel is fixed in the center position by means of a fixture.

5. The method according to claim 4, wherein a force sensing arrangement is arranged to determine forces in a plane parallel with the wheel axes between the first wheel and the fixture.

6. The method according to claim 5, wherein the AGV comprises at least three drive units, and wherein the method comprises:
   positioning a third wheel tangentially on an imaginary third circle centered with respect to the center position;
   driving the third wheel a third distance along the third circle at the same time as the second wheel is driven the second distance along the second circle;
   determining the third distance based on data from the wheel sensor device of the third wheel; and
   determining the relative positions between the first wheel and the third wheel based on the third distance and the angle of rotation;
   wherein the positioning of the second wheel tangentially on the second circle and/or the positioning of the third wheel tangentially on the third circle comprises:
   controlling the steering position of the second wheel about the second steering axis based on a second target steering position;

controlling the steering position of the third wheel about the third steering axis based on a third target steering position;

rotating the support structure relative to the first wheel over a first steering axis range by controlling the wheel torque of the second wheel about the second wheel axis and/or by controlling the wheel torque of the third wheel about the third wheel axis; and adjusting the steering position of the second wheel and/or the steering position of the third wheel based on a force determined by the force sensing arrangement during the rotation of the support structure.

7. An automated guided vehicle, AGV, comprising a support structure and at least two drive units connected to the support structure, wherein each drive unit comprises:
- a wheel rotatable about a wheel axis and about a steering axis perpendicular to the wheel axis;
- a wheel motor arranged to drive the wheel about the wheel axis;
- a wheel sensor device arranged to determine a rotational position of the wheel about the wheel axis;
- a steering motor arranged to drive the wheel about the steering axis; and
- a steering sensor device arranged to determine a rotational position of the wheel about the steering axis;

wherein a controller is configured to calibrate positions of the wheels of the at least two drive units, wherein for calibrating the positions of the wheels, the controller is configured to:

position a second wheel tangentially on an imaginary second circle centered with respect to a center position in which a first wheel is fixed;

drive the second wheel a second distance along the second circle such that the AGV rotates about the center position;

determine the second distance based on data from the second wheel sensor device of the second wheel;

determine an angle of rotation about the center position based on data from the first steering sensor device of the first wheel during the rotation of the AGV; and determine relative positions between the first wheel and the second wheel based on the second distance and the angle of rotation.

\* \* \* \* \*